United States Patent [19]
Enomoto et al.

[11] Patent Number: 5,697,347
[45] Date of Patent: Dec. 16, 1997

[54] FUEL INJECTION TIMING CONTROL APPARATUS FOR A FUEL INJECTION PUMP AND CONTROL METHOD FOR THE SAME

[75] Inventors: Shigeiku Enomoto; Yasuyuki Sakakibara; Moriyasu Gotoh; Huminori Suzuki, all of Nishio, Japan

[73] Assignee: Nippon Soken, Inc., Aichi-pref., Japan

[21] Appl. No.: 719,204

[22] Filed: Sep. 25, 1996

Related U.S. Application Data

[63] Continuation of Ser. No. 583,724, Jan. 17, 1996, abandoned.

[30] Foreign Application Priority Data

Jan. 17, 1995 [JP] Japan .................................. 7-005101
Oct. 17, 1995 [JP] Japan .................................. 7-268702

[51] Int. Cl.$^6$ .................................................. F02M 37/04
[52] U.S. Cl. .................................................. 123/502
[58] Field of Search .......................... 123/502, 357, 123/500–1

[56] References Cited

U.S. PATENT DOCUMENTS

| | | | |
|---|---|---|---|
| 4,753,211 | 6/1988 | Hofer | 123/502 |
| 4,754,738 | 7/1988 | Grohn et al. | 123/502 |
| 4,977,882 | 12/1990 | Nakamura et al. | 123/502 |

*Primary Examiner*—Thomas N. Moulis
*Attorney, Agent, or Firm*—Cushman, Darby & Cushman IP Group of Pillsbury Madison & Sutro LLP

[57] ABSTRACT

A target fuel injection timing of the fuel injection pump is calculated based on the operating conditions of a diesel engine (Steps 102; 302; 602), while an actual fuel injection timing is calculated based on crank angle signals (Steps 103; 303: 603). Then, a fuel injection timing error (Terr) is obtained based on a difference between the target fuel injection timing and the actual fuel injection timing (Steps 104; 304; 604). To adjust the actual fuel injection timing based on the error (Terr), a rotational position of a roller ring (10) is controlled through a timer piston (21) slidable and housed in a timer device (28) by a hydraulic pressure control valve (27) in response to a pulse actuating signal having a controllable duty ratio (DFIN). The pulse actuating signal having the controlled duty ratio is generated at a predetermined pulse output timing (Steps 208; 406; 706), so that the fuel injection caused by a force feeding stroke of the fuel injection pump is not overlapped with an actual valve-open duration of hydraulic pressure control valve (27) varying depending on the engine speed (N), thereby completely locking the timer piston (21) during the fuel injection.

46 Claims, 21 Drawing Sheets

→ TIME

FUEL INJECTION TIMING CONTROL APPARATUS FOR A FUEL INJECTION PUMP AND CONTROL METHOD FOR THE SAME

This is a continuation of application Ser. No. 08/583,724, filed on 17 Jan. 1996, which was abandoned upon the filing hereof.

BACKGROUND OF THE INVENTION

1. Field of the Invention

This invention generally relates to a fuel injection timing control apparatus for a fuel injection pump chiefly used for supplying fuel into a diesel engine and the control method for the same, and more particularly to an apparatus and a method for controlling a fuel injection timing of a fuel injection pump using a hydraulic pressure control valve which is opened or closed in response to a pulse actuating signal with a controlled duty ratio.

2. Related Art

FIG. 24 shows a conventional fuel injection timing control apparatus used for adjusting the fuel injection timing of a fuel injection pump. This fuel injection timing control apparatus comprises a timer apparatus 28 which includes a timer piston 21 urged by a spring member at one side so as to be slidable in a housing and receiving hydraulic pressure at the other side thereof so as to be positioned at a desired position in accordance with the pressure balance between the hydraulic pressure in a timer high-pressure chamber 22 and the spring member in a timer low-pressure chamber 24.

The timer piston 21 is connected to a roller ring 10 of the fuel injection pump through a slide pin 19. The rotational angle position of roller ring 10 is adjusted by sliding timer piston 21 in the housing of the timer apparatus 28.

A hydraulic pressure control valve 27 is associated with the timer apparatus 28; namely, hydraulic pressure control valve 27 has a valve needle 52 interposed in a relief passage 51 connecting timer high-pressure chamber 22 with timer low-pressure chamber 24 of timer apparatus 28. The hydraulic pressure control valve 27 actuates its valve needle 52 to open or close relief passage 51 in response to a pulse actuating signal with a variable duty ratio to determine the hydraulic pressure in the timer high-pressure chamber 22, thereby controlling the position of timer piston 21 to adjust the rotational angle position of roller ring 10.

There is provided another relief passage 50 connecting timer high-pressure chamber 22 with a low-pressure chamber 15. An orifice 23 is provided in this relief passage 50.

According to the above-described conventional fuel injection timing control apparatus, the hydraulic pressure control valve 27 is controlled by the pulse actuating signal with a controllable duty ratio.

FIGS. 25B and 25C show the relationship between such a pulse actuating signal and the fuel injection timing. In the case of FIG. 25B, the fuel injection timing is overlapped with "ON" duration of the pulse actuating signal. When the pulse actuating signal is "ON", hydraulic pressure control valve 27 opens the relief passage 51 so as to reduce the hydraulic pressure in timer high-pressure chamber 22. Hence, roller ring 10 is rotated in a retard direction through timer piston 21. As shown in FIG. 25B, the roller ring angle is continuously reduced toward the retard direction during the fuel injection period. Hence, the gradient of the lift curve (an alternate long and short dash line) is reduced compared with the average lift curve (a solid line) as shown in FIG. 25A. The lift curve shown in FIG. 25A is a lift curve of a cam roller which is brought into contact with roller ring 10.

On the other hand, in the case of FIG. 25C, the fuel injection timing is overlapped with "OFF" duration of the pulse actuating signal. When the pulse actuating signal is "OFF", hydraulic pressure control valve 27 closes the relief passage 51 so as to increase the hydraulic pressure in timer high-pressure chamber 22. Hence, roller ring 10 is rotated in an advance direction through timer piston 21. As shown in FIG. 25C, the roller ring angle is continuously increased toward the advance direction during the fuel injection period. Hence, the gradient of the lift curve (an alternate long and two short dashes line) is increased compared with the average lift curve (the solid line) as shown in FIG. 25A.

The gradient of the cam lift curve shown in FIG. 25A generally represents the fuel injection rate. However, as explained above, the gradient of the cam lift curve varies in accordance with the ON/OFF condition of the pulse actuating signal. In general, the ON/OFF condition of the pulse actuation signal supplied to hydraulic pressure control valve 27 is not correlated to the fuel injection period. Hence, the fuel injection rate is undesirably changed by the ON/OFF condition of the pulse actuating signal.

To suppress the undesirable change of fuel injection rate during the fuel injection period, Unexamined Japanese patent application NO. SHO 62-101865, published in 1987, discloses a fuel injection timing control apparatus capable of preventing a pulse actuating signal from being undesirably varied during the fuel injection period. According to this apparatus, there is provided a waveform shaping circuit for obtaining an NE (engine speed) pulse signal by shaping the waveform of a speed signal obtained from a rotational angle sensor provided in the fuel injection pump. Then, the pulse actuating signal is output in synchronism with thus obtained NE signal, thereby actuating the hydraulic pressure control valve at a predetermined synchronized timing.

However, in view of the recent enhanced restriction of exhaust gas emission, there is a tendency that the level of fuel injection pressure is stepped up to a higher pressure. Due to such an increased fuel injection pressure, the face cam receives a larger torque reaction force during a force feeding stroke of a plunger of the fuel injection pump. The timer piston 21, transmitted the torque reaction force through roller ring 10 and slide pin 19, is shifted right (i.e. the retard direction) in the drawing. If the hydraulic pressure control valve 27 opens the relief passage 51, a greater amount of fuel will be sent out from timer high-pressure chamber 22 to timer low-pressure chamber 24. Hence, timer piston 21 is excessively shifted toward the retard direction, resulting in undesirable reduction of fuel injection pressure.

More specifically, it is generally desirable that hydraulic pressure control valve 27 is always closed in synchronism with the force feeding stroke of the plunger. However, according to the fuel injection timing control apparatus for a fuel injection pump disclosed in Unexamined Japanese patent application NO. SHO 62-101865, no consideration is given to a time delay or time lag required for valve needle 52 of hydraulic pressure control valve 27 to switch between its valve open position to its valve close position in response to the pulse actuating signal.

Hence, the force feeding stroke of the plunger may be overlapped with the actual valve-open duration of hydraulic pressure control valve 27 varying depending on the engine speed, causing the reduction of fuel injection pressure under such an overlapped condition.

Furthermore, another recent trend is that timer piston 21 is required to respond quickly. To this end, there is a tendency that the diameter of orifice 23 is enlarged than ever.

However, as the fuel injection pressure is increased, there is the possibility that fuel in timer high-pressure chamber 22 is excessively flowed to timer low-pressure chamber 15 through the enlarged orifice 23 when the pressure of timer high-pressure chamber 22 becomes larger than that of low-pressure chamber 15 during thee force-feeding stroke of the plunger. Such an excessive flow of fuel through enlarged orifice 23 will result in reduction of the fuel injection pressure.

SUMMARY OF THE INVENTION

Accordingly, in view of above-described problems encountered in the related art, a principal object of the present invention is to provide an excellent fuel injection timing control apparatus for a fuel injection pump and the control method for the same.

In order to accomplish this and other related objects, one aspect of the present invention provides, as illustrated in FIG. 1, a fuel injection timing control apparatus for a fuel injection pump comprises a fuel injection pump (M1), a fuel injection timing adjusting means (M2), a hydraulic pressure control valve (M3), a diesel engine (M4), an operating condition detecting means (M5), a target fuel injection timing calculating means (M6), an actuating signal control means (M7), an actuating signal generating means (M8); and a rotational angle detecting means (M9).

The fuel injection timing adjusting means (M2) adjusts a fuel injection timing of the fuel injection pump (M1) by controlling a rotational ,position of a roller ring or an equivalent member of the fuel injection pump (M1) through a timer piston slidable and housed in a timer device. The timer piston is positioned in equilibrium with hydraulic pressure of fuel supplied in a pressure chamber of the timer device. The hydraulic pressure control valve (M3) is opened and closed in response to a pulse actuating signal having a duty ratio controllable, for controlling the hydraulic pressure of the fuel supplied in the pressure chamber of the timer device.

The operating condition detecting means (M5) detects operating conditions of the diesel engine (M4) which is supplied with fuel from the fuel injection pump (M1). The target fuel injection timing calculating means (M6) calculates a target fuel injection timing of the fuel injection pump based on the operating conditions detected by the operating condition detecting means (M5).

The actuating signal control means (M7) controls the duty ratio of the pulse actuating signal fed to the hydraulic pressure control valve (Me) in such a manner that the fuel injection timing adjusted by the fuel injection timing adjusting means (M2) is equalized with the target fuel injection timing calculated by the target fuel injection timing calculating means (M6).

The rotational angle detecting means (M9) detects a predetermined rotational angle prior to a fuel injection by the fuel injection pump (M1). And, the actuating signal generating means (M8) generates the pulse actuating signal having the duty ratio controlled by the actuating signal control means (M7) at a predetermined pulse output timing.

The pulse output timing is determined based on the rotational angle detected by the rotational angle detecting means (M9) and a rotational speed (N) of the diesel engine so that the fuel injection caused by a force feeding stroke of the fuel injection pump (M1) is not overlapped with an actual valve-open duration of the hydraulic pressure control valve (M3) varying depending on the rotational speed of the diesel engine, thereby completely locking the timer piston during the fuel injection.

According to the above-described fuel injection timing control apparatus, it become possible to surely preventing the fuel injection pressure or amount from undesirably changed during the force feeding stroke of the fuel injection pump.

Furthermore, another aspect of the present invention provides a fuel injection timing control method for a fuel injection pump, comprising steps of: detecting operating conditions of a diesel engine which is supplied with fuel from the fuel injection pump; calculating a target fuel injection timing of the fuel injection pump based on the detected operating conditions of the diesel engine; calculating an actual fuel injection timing of the fuel injection pump based on crank angle signals; calculating a fuel injection timing error based on a difference between the target fuel injection timing and the actual fuel injection timing; adjusting the actual fuel injection timing of the fuel injection pump by controlling a rotational position of a roller ring or an equivalent member of the fuel injection pump through a timer piston slidable and housed in a timer device, the timer piston being positioned in equilibrium with hydraulic pressure of fuel supplied in a pressure chamber of the timer device, the hydraulic pressure being varied by opening and closing a hydraulic pressure control valve in response to a pulse actuating signal having a duty ratio controllable in such a manner that the actual fuel injection timing is equalized with the target fuel injection timing; detecting a predetermined rotational angle prior to a fuel injection by the fuel injection pump; generating the pulse actuating signal having the controlled duty ratio at a predetermined pulse output timing, the output timing being determined based on the detected rotational angle and a rotational speed of the diesel engine so that the fuel injection caused by a force feeding stroke of the fuel injection pump is not overlapped with an actual valve-open duration of the hydraulic pressure control valve varying depending on the rotational speed of the diesel engine, thereby completely locking the timer piston during the fuel injection.

According to features in the preferred embodiments, it is desirable that a check valve is provided in a fluid passage connecting the pressure chamber of the timer device and a reduced-pressure chamber of the fuel injection pump. The check valve can be constituted by a ball closing the fluid passage by gravity.

Furthermore, it is preferable that the pulse output timing is determined taking account of a delay time of a valve member of the hydraulic control valve. The pulse output timing can be advanced in accordance with the rotational speed of the diesel engine. The pulse output timing may be synchronized with the rotational speed of the diesel engine in a limited engine operating region where the rotational speed of the diesel engine is lower than a predetermined engine speed. In this case, the pulse output timing is set at constant intervals irrespective the rotational speed of the diesel engine when the rotational speed of the diesel engine is higher than the predetermined engine speed.

Still further, it is preferable that a ratio of ON-duty of the pulse actuating signal fed to the hydraulic pressure control valve is corrected by a correction factor reflecting an angle of an accelerator when the control of the pulse output timing is switched at the predetermined engine speed. In this case, the correction factor is smaller than 1 and decreases with increasing angle of the accelerator at a moment the rotational speed of the diesel engine exceeds the predetermined engine speed. On the other hand, the correction factor is larger than 1 and increases with increasing angle of the accelerator at a moment the rotational speed of the diesel engine falls below the predetermined engine speed.

Moreover, it is desirable, when an ON-duty time of the pulse actuating signal fed to the hydraulic pressure control valve is smaller than a predetermined minimum valve-open time, that the ON-duty time is equalized to the minimum valve-open time.

Yet further, the pulse output timing for generating the pulse actuating signal can be determined so as to open the hydraulic pressure control valve in synchronism with a termination of the force feeding stroke of the fuel injection pump. Furthermore, it will be preferable that a ratio of ON-duty of the pulse actuating signal fed to the hydraulic pressure control valve is restricted within a predetermined range.

BRIEF DESCRIPTION OF THE DRAWINGS

The above and other objects, features and advantages of the present invention will become more apparent from the following detailed description which is to be read in conjunction with the accompanying drawings, in which.

DETAILED DESCRIPTION OF THE PREFERRED EMBODIMENTS

Figure 1:
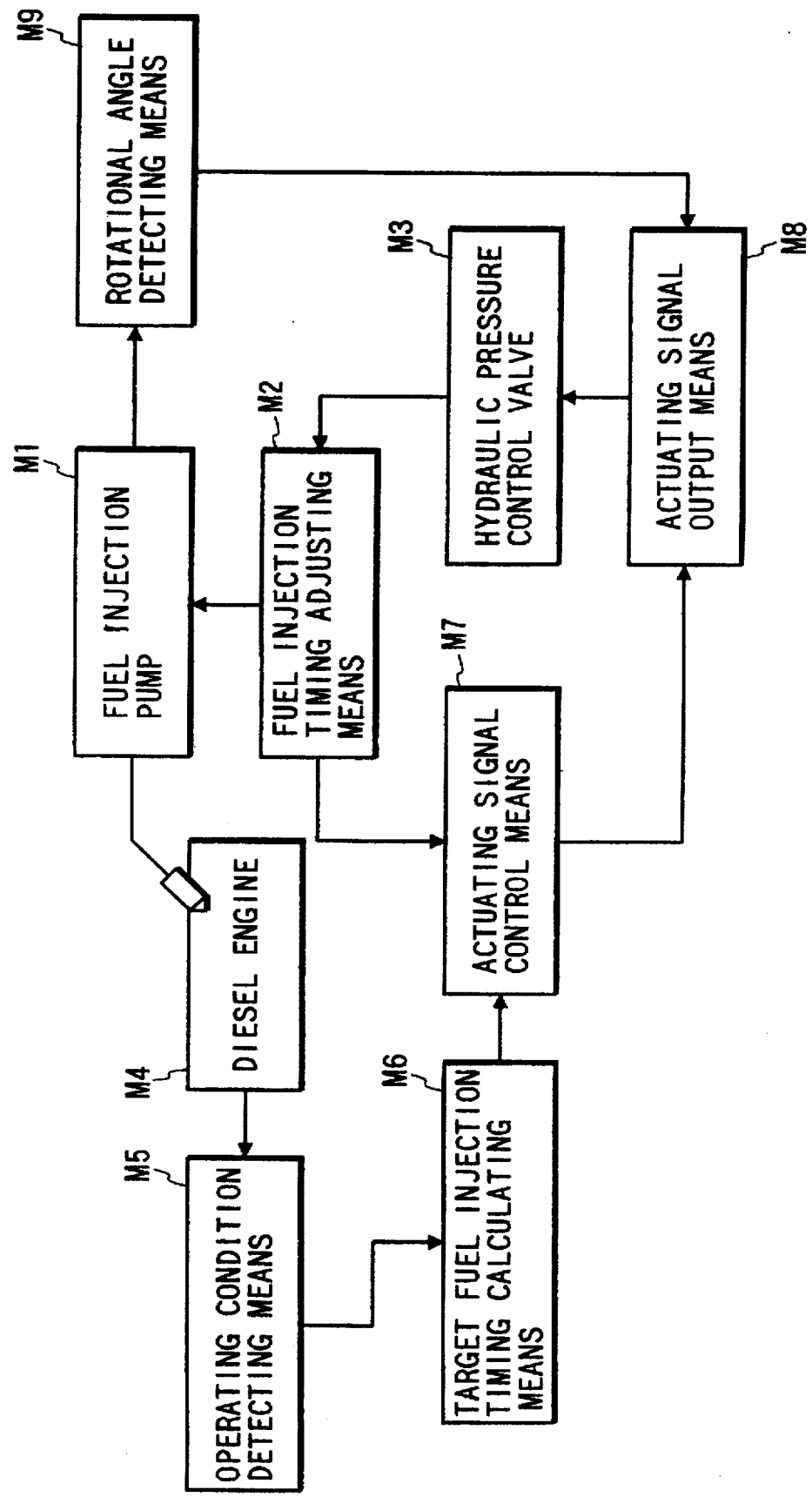
FIG. 1 is a schematic block diagram showing main components of a fuel injection timing control system for a fuel injection pump in accordance with the present invention.

Preferred embodiments of the present invention will be explained in greater detail hereinafter, with reference to the accompanying drawings. Identical parts are denoted by identical reference numerals throughout views.

First Embodiment

Figure 2:
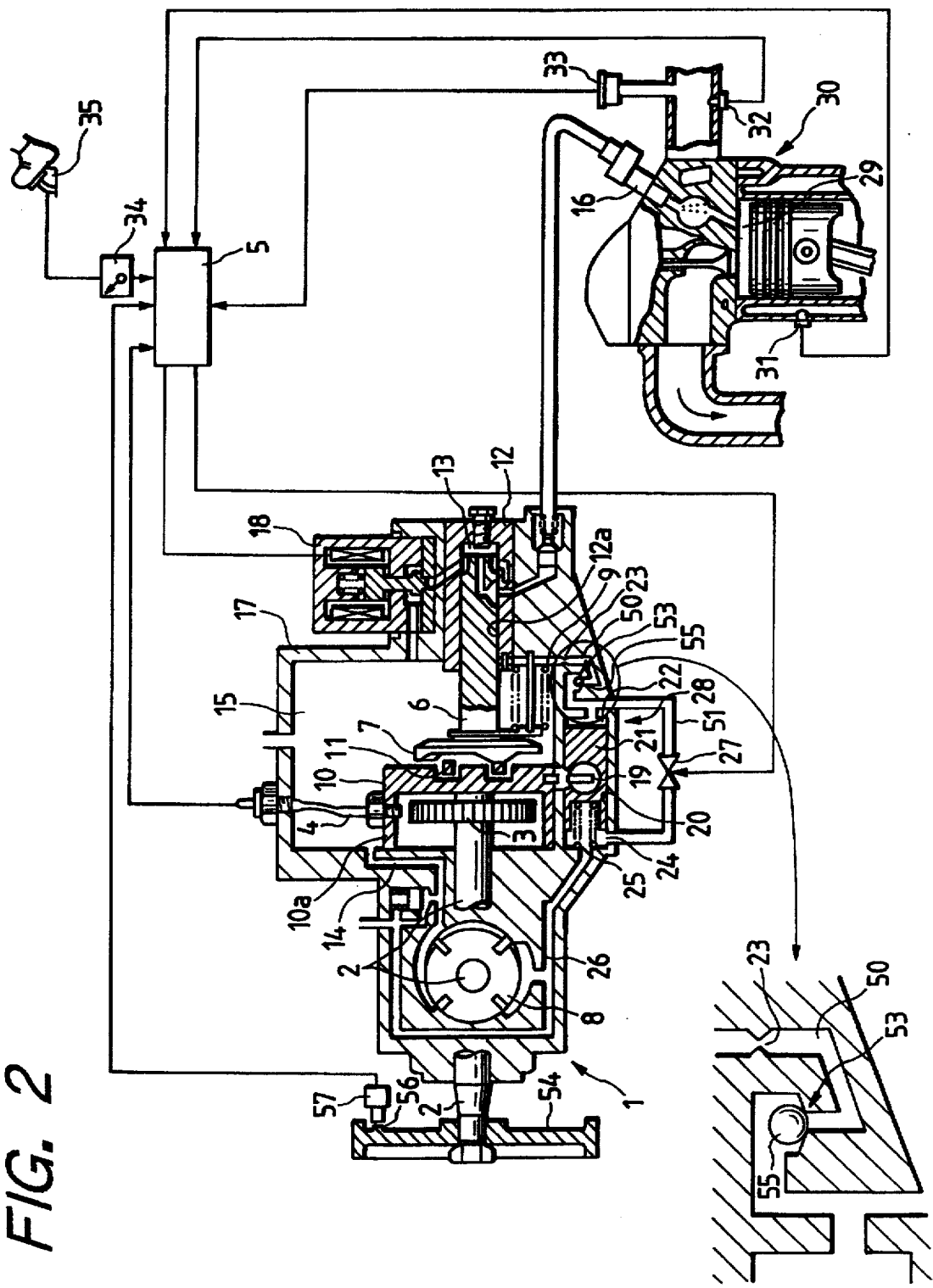
FIG. 2 is a cross-sectional view showing an overall arrangement of a face cam force-feeding & distribution type fuel injection pump and an associated fuel injection timing control system in accordance with a first embodiment of the present invention.

FIG. 2 is a cross-sectional view showing an overall arrangement of a face cam force-feeding & distribution type fuel injection pump and an associated fuel injection timing control system in accordance with a first embodiment of the present invention, including an enlarged view showing details of a timer apparatus.

A drive pulley 54 is securely connected to one end of a drive shaft 2, and driven by an engine (not shown) at a half speed of the engine speed. A signal rotor 3 is attached coaxially on the other end of drive shaft 2. A plurality of toothed protrusions are formed around the circumferential periphery of signal rotor 3. A rotational angle sensor 4 is disposed in a confronting relation to the circumferential periphery of the signal rotor 3. The rotational angle sensor 4 picks up electromagnetic induction produced by each toothed protrusion and generates a signal proportional to the engine speed to be sent to electronic control unit 5.

The drive shaft 2 is connected to a face cam 7 and a vane pump 8. The face cam 7 drives a plunger 6 disposed at a behind side thereof. Plunger 6 is used for the force feeding of fuel. The vane pump 8 serves as a fuel feed pump. The face cam 7 is integrally formed with plunger 6 and is urged by a spring member 9 against rollers 11 received in a roller ring 10. More specifically, face cam 7 has a cam profile on the surface confronting with rollers 11. When face cam 7 is rotated by drive shaft 7, a protrusion of the cam profile of face cam 7 rides on roller 11. Thus, face cam 7 and plunger 6 respectively cause reciprocative motion in an axial direction thereof in addition to the rotational motion about an axis thereof. The engagement between drive shaft 2 and face cam 7 is such that both are engaged or locked with each other in the rotational direction but are free or unlocked in the axial direction so as to allow face cam 7 and plunger 6 to cause the reciprocative motion independent of drive shaft 2.

The plunger 6 is housed in a cylinder bore 12a of pump cylinder 12 so as to form a pressure chamber 13 at an innermost end of the cylinder bore 12a. The volume of pressure chamber 13 is increased or reduced in synchronism with the reciprocative motion of plunger 6. Furthermore, plunger 6 is formed with an inside passageway communicatable with a fuel inlet port and a fuel outlet port formed on the inner surface of cylinder bore 12a. When plunger 6 causes a rotational motion in synchronism with drive shaft 2, the inside passageway is alternately communicated with the fuel inlet port and the fuel outlet port.

The vane pump 8 feeds pressurized fuel through its outlet port 14 to a low-pressure chamber 15. Fuel stored in low-pressure chamber 15 is sucked into pressure chamber 13 and then pressurized to a higher pressure by the compression stroke (one of reciprocative motions) of plunger 6. The fuel thus pressurized in pressure chamber 13 is, then, forcibly fed to a fuel injection valve 16 at a predetermined timing. Thus, fuel injection valve 16 supplies fuel into a combustion chamber 29 of each cylinder in diesel engine 30.

A housing 17 of fuel injection pump 1 is provided with an electromagnetic spill valve 18 which releases the hydraulic pressure in the pressure chamber 13. By opening or closing electromagnetic spill valve 18 by electronic control apparatus 5, various fuel injection factors such as the fuel injection timing, fuel injection amount and injection rate can be controlled.

The circumferential peripheral surface of the cylindrical roller ring 10 can rotate about an axis of drive shaft 2 within a predetermined angle. With this rotation, it becomes possible to slightly change the position of each roller 11 with respect to face cam 7. Hence, the timing of roller 11 riding on protrusion of the cam profile formed on face cam 7 is varied correspondingly, thereby changing the fuel injection timing.

To rotate roller ring 10, there is provided a slide pin 19 extends downward from roller ring 10. The lower end of slide pin 19 is connected to timer piston 21 which is slidably accommodated in a timer cylinder 20 formed in the housing 17.

During the force-feeding stroke of plunger 6, face cam 7 is subjected to a reaction force acting from plunger 6 derived from compression of fuel. This reaction force is transmitted from face cam 7 to timer piston 21 through slide pin 19; hence timer piston 21 is pushed right in FIG. 3 so as to increase the hydraulic pressure in timer high-pressure chamber 22 of timer piston 21.

As shown in FIG. 2, timer high-pressure chamber 22 communicates with low-pressure chamber 15 through relief passage 50. A check valve 53 and an orifice 23 are provided in this relief passage 50. The check valve 53 opens the relief passage 50 only when the pressure of low-pressure chamber 15 exceeds the pressure of timer high-pressure chamber 22. When the relief passage 50 is opened, the fuel pressurized by vane pump 8 is introduced into timer high-pressure chamber 22.

The timer piston 21 is pushed left when it receives the hydraulic pressure acting from timer high-pressure chamber 22. To resist such a hydraulic pressure, a timer spring 25 is disposed in a timer low-pressure chamber 24. The timer low-pressure chamber 24 is formed at a left side of timer piston 21 so as to oppose to timer high-pressure chamber 22 formed at a right side of timer piston 21.

The timer low-pressure chamber 24 communicates with a suction port 26 of vane pump 8, and is therefore maintained at a low pressure when vane pump 8 operates. The hydraulic pressure acting from timer high-pressure chamber 22, i.e. fuel feed pressure, varies in accordance with the engine speed, i.e. the rotational speed of drive shaft 2. Therefore, timer piston 21 shifts to a position where the hydraulic pressure of timer high-pressure chamber 22 is balanced with the resilient force of spring member 25. The shift movement of timer piston 21 is transmitted to roller ring 10 through slide pin 19, so that the rotational angle of roller ring 10 is adjusted. In this manner, the fuel injection timing is varied in accordance with the engine speed.

As shown in FIG. 2, check valve 53 of the present embodiment is constituted by a free ball 55 and a concave seat formed in relief passage 50. The concave seat has the capacity and depth large enough to loosely receive ball 55 so as to allow the ball 55 to float upward or settle on the bottom of the seat. In a normal condition, ball 50 settles on the bottom of the concave seat due to the gravity acting on ball 50, thereby closing relief passage 50. Utilizing the function of gravity of the free ball 55 is advantageous in that no spring member is required for constituting the check valve 53.

A hydraulic pressure control valve 27, constituted by an electromagnetic or solenoid valve, is interposed in a relief passage 51 connecting timer high-pressure chamber 22 and timer low-pressure chamber 24. The hydraulic pressure control valve 27 is electrically connected to electronic control unit 5, so as to open or close relief passage 51 in response to a control signal supplied from electronic control unit 5. When hydraulic pressure control valve 27 opens relief passage 51, the fuel stored in timer high-pressure chamber 22 is partly returned to timer low-pressure chamber, reducing the hydraulic pressure in timer high-pressure chamber 22. In response to the reduction of hydraulic pressure, timer piston 21 causes a shift movement so as to change the rotational position of roller ring 10, thereby controlling the fuel injection timing of fuel.

Figure 24:
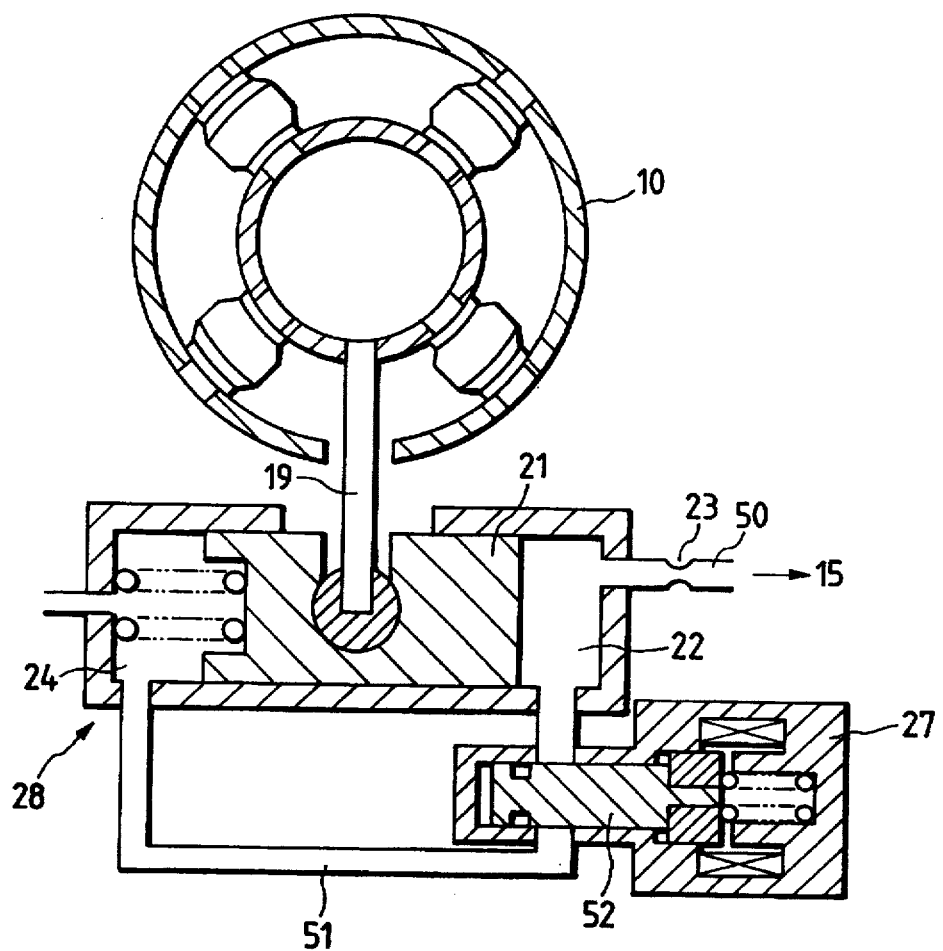
FIG. 24 is a cross-sectional view showing an arrangement of a conventional fuel injection timing control apparatus.
Figure 25A:
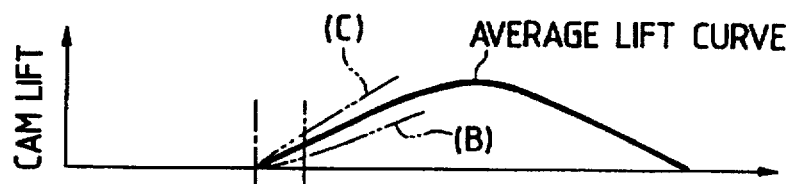
FIGS. 25A through 25C are time charts showing the operation of the conventional fuel injection timing control apparatus.
Figure 25B:
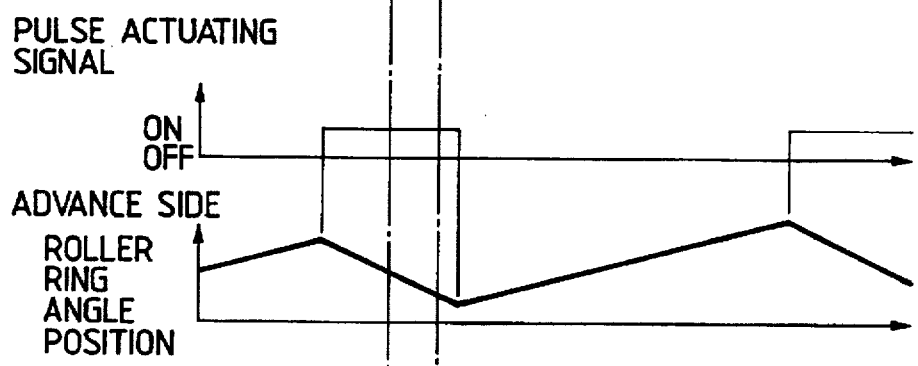
Figure 25C:
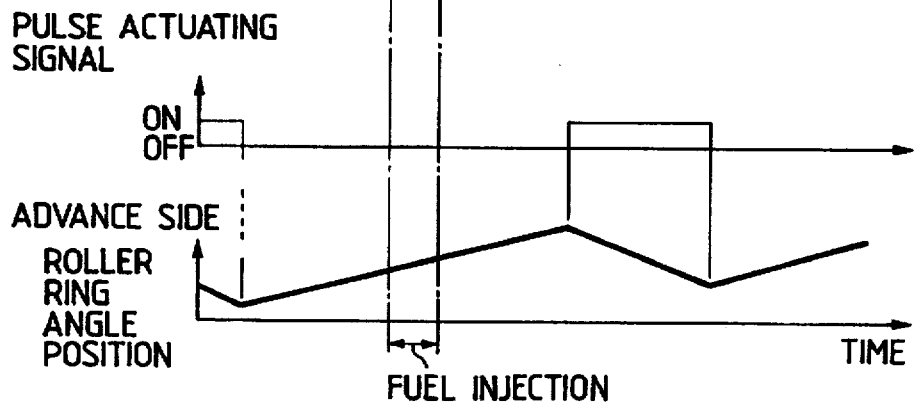

As explained above, the construction of timer apparatus 28 shown in FIG. 2 is substantially the same as that of the conventional apparatus shown in FIG. 24. Namely, the timer apparatus 28 of the face cam force-feeding & distribution type fuel injection pump 1 of the present invention comprises timer cylinder 20, timer piston 21, roller ring 10 linked to timer piston 21, hydraulic pressure control valve 27 controlling the position of timer piston 21, and others.

By the way, FIG. 2 depicts timer piston 21 as being parallel to drive shaft 2. However, FIG. 2 is a sort of convenience drawing which intentionally changes the arrangement of some components. More specifically, the actual structural relationship between timer piston 21 and drive shaft 2 is such that the axis of timer piston 21 is disposed perpendicularly to the axis of drive shaft 2. Furthermore, FIG. 2 depicts vane pump 8 as having an axis normal to the axis of drive shaft 2. The purpose of this kind of illustration shown in FIG. 2 is only for simplifying the understanding of the arrangement of the first embodiment.

The roller ring 10 is determined its rotational position by timer apparatus 28 and hydraulic pressure control valve 27 and is equipped with rotational angle sensor 4 as described above. The rotational angle sensor 4, disposed in a confronting relationship to signal rotor 3, generates a signal every time each projection formed on the circumferential periphery of signal rotor 3 passes by. The signal detected by rotational angle sensor 4 represents the rotational speed of fuel injection pump 1, i.e. the engine speed of diesel engine 30. The fuel injection period of the fuel injection pump is also detected based on the signal from rotational angle sensor 4.

Figure 3:
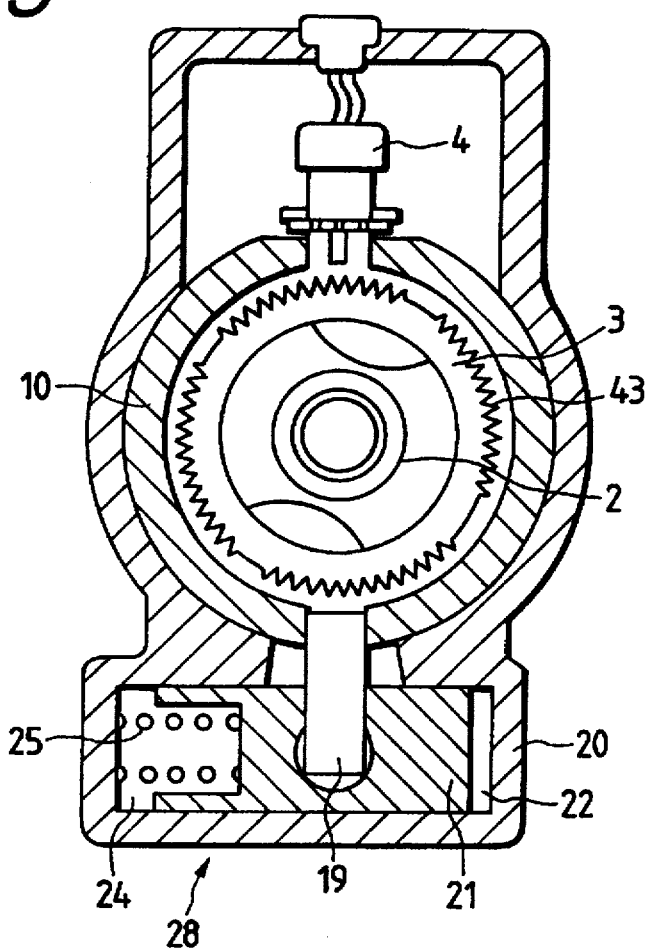
FIG. 3 is an enlarged view showing part of the fuel injection pump shown in FIG. 2.
Figure 4A:
FIG. 4A is a time chart showing a signal detected by a rotational angle sensor and FIG. 4B is a time chart showing a signal obtained by converting the signal of FIG. 4A through a waveform shaping circuit.
Figure 4B:
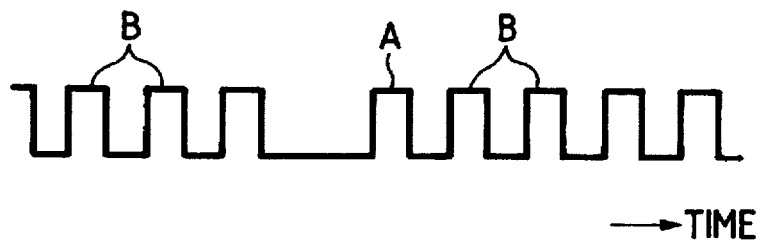

As shown in FIG. 3, signal rotor 3 is provided at its circumferential periphery with a total of 56 protrusions 43 consisting of four groups each including 14 protrusions. In other words, signal rotor 3 includes four cutout teeth separating plural protrusions 43 into four groups. FIG. 4A shows a signal waveform of the signal actually obtained from rotational angle sensor 4. FIG. 4B is a signal waveform of a pulse signal obtained by converting the detection signal shown in FIG. 4A through a waveform shaping circuit, wherein a pulse "A" represents a reference signal synchronized with the fuel injection period while "B" represents a rotational angle signal representing the rotational speed.

The rotational angle sensor 4 is fixed on a circumferential periphery surface 10a of roller ring 10, and is therefore rotatable together with roller ring 10. Hence, the lift timing of face cam 7, i.e. injection timing of fuel, is detectable from the reference signal "A" and rotational angle signal "B". The signal obtained from rotational angle sensor 4 is sent to electronic control unit 5.

The drive pulley 54 is provided with a protrusion 56. A TDC sensor 57 is disposed closely to drive pulley 54 to pick up electromagnetic induction produced by the protrusion 56. The signal detected by TDC sensor 57 is sent to electronic control unit 5.

The diesel engine 30 is equipped with a cooling water temperature sensor 31 detecting the temperature of cooling water, an intake air temperature sensor 32 detecting the temperature of intake air, and intake air pressure sensor 33 detecting the pressure of intake air. From detection signals obtained from these sensors 31, 32 and 33, operating conditions of diesel engine 30 can be detected. A reference numeral 34 represents an accelerator sensor detecting the depression amount of an accelerator pedal 35. The signal obtained from this sensor 34 also represents the operating condition of the diesel engine 30.

The signals from cooling water temperature sensor 31, intake air temperature sensor 32, intake air pressure sensor 33, accelerator sensor 34, TDC sensor 57, and rotational angle sensor 4 are respectively input into electronic control unit to control electromagnetic spill valve 18 and hydraulic pressure control valve 27. More specifically, electronic control unit 5 controls electromagnetic spill valve 18 and hydraulic pressure control valve 27 in accordance with the operating conditions of diesel engine 30 detected from above-described various sensors.

Figure 5:
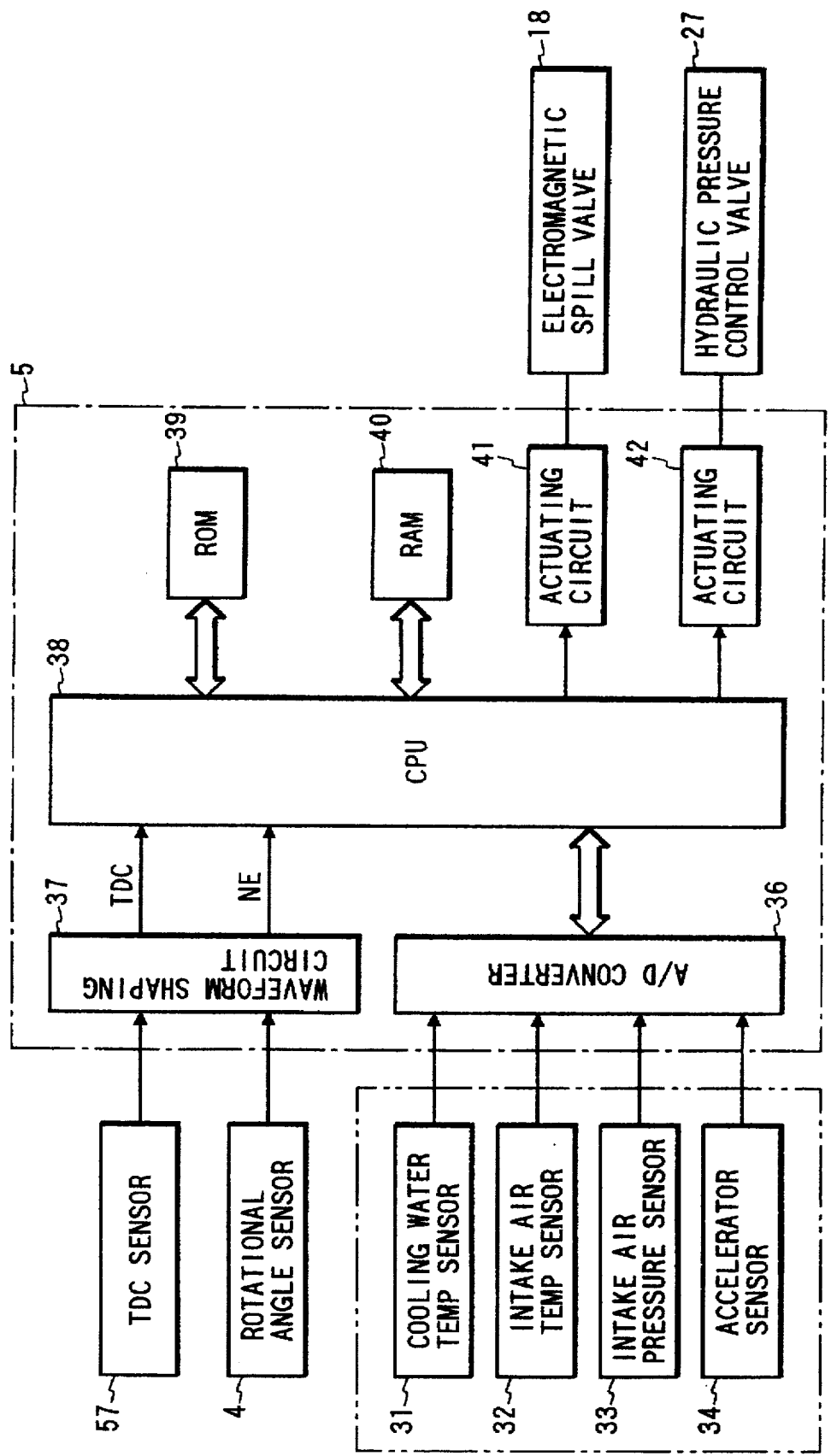
FIG. 5 is a circuit diagram showing an electronic control unit and associated components in accordance with the present invention.

FIG. 5 is a circuit diagram showing electronic control unit 5 and associated components. Electronic control unit 5 comprises an A/D converter 36 converting analog signals obtained from sensors 31-34 into digital signals, a waveform shaping circuit 37 sharing the waveform of signals obtained from sensors 4 and 57, a CPU 38 executing the fuel injection control of fuel injection pump 1 based on detection signals input through A/D converter 36 and waveform shaping circuit 37, a ROM 39 memorizing control programs or various data required to execute the predetermined control processing in CPU 38, a RAM temporarily memorizing data used in the computations in CPU 38, and actuating circuits 41 and 42 supplying actuating signals to electromagnetic spill valve 18 and hydraulic pressure control valve 27, respectively.

A first embodiment of the present invention will be explained with reference to FIGS. 6 through 8, hereinafter.

Figure 6:
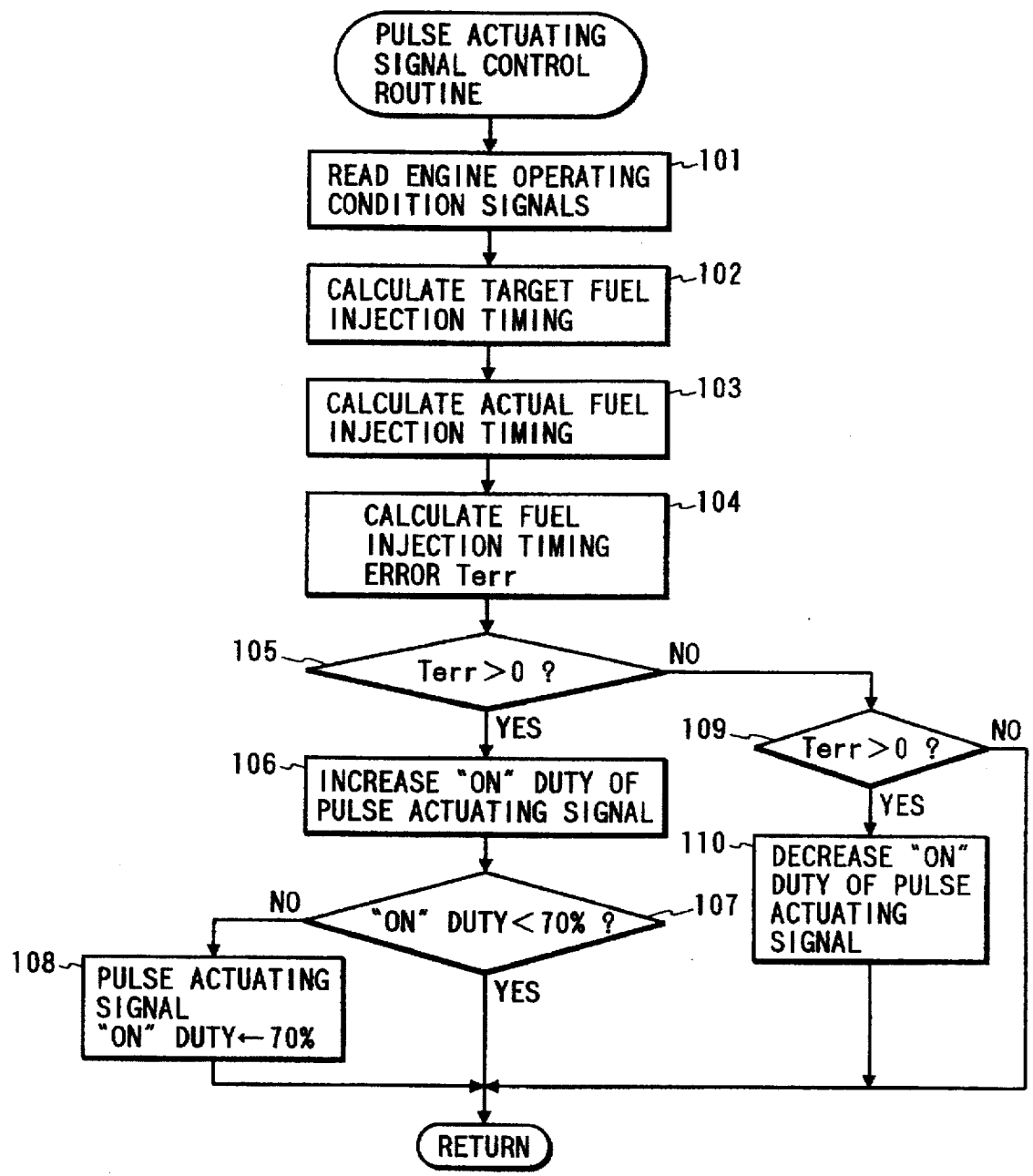
FIG. 6 is a flow chart showing a pulse actuating signal control routine in accordance with a first embodiment of the present invention.

FIG. 6 is a flow chart showing a pulse actuating signal control routine in accordance with the first embodiment of the present invention. This control routine is repeatedly executed in electronic control unit 5 to perform the feedback control of a duty ratio of the pulse actuating signal supplied to hydraulic pressure control valve 27, so that the fuel injection timing of diesel engine 30 is adjusted to a target or optimum fuel injection timing determined based on the operating conditions of diesel engine 30.

Upon starting this routine, the operating conditions of diesel engine 30 are checked in step 101 by reading the detection signals from cooling water temperature sensor 31, intake air temperature sensor 32, intake air pressure sensor 33 and accelerator sensor 34.

Next, in step 102, a target fuel injection timing is calculated based on engine speed "N" calculated in a later-described routine and the data representing the engine operating conditions read in step 101. First of all, a fundamental fuel injection timing is calculated using the parameters of engine speed "N" and the depression amount of the accelerator pedal 35 detected by accelerator sensor 34. Thereafter, the fundamental fuel injection timing is corrected by the values of cooling water temperature "THW", intake air temperature "Ta", intake air pressure "Pa" and others, thereby finally obtaining the target fuel injection timing.

Subsequently, in step 103, an actual fuel injection timing is calculated based on the detection signals from TDC sensor 57 and rotational angle sensor 4. More specifically, the start timing of the fuel injection can be known from the detection signal of rotational angle sensor 4, while TDC sensor 57 generates the signal representing the crank angle. Hence, by detecting the signals of rotational angle sensor 4 and TDC sensor 57, the actual fuel injection timing can be calculated in relation to the crank angle of diesel engine 30.

Thereafter, in step 104, a fuel injection timing error "Terr" is calculated as a difference between the target fuel injection timing obtained in step 102 and the actual fuel injection timing obtained in step 103.

Then, a judgement is made in step 105 to check whether "Terr" is larger than "0". If "Terr" is larger than "0", i.e. when the actual fuel injection timing is advanced with respect to the target fuel injection timing, the flow proceeds to step 106 to increase the ratio of "ON" duty of the pulse actuating signal to retard the actual fuel injection timing, thereafter proceeding to step 107.

In the step 107, another judgement is made to check whether the "ON" duty of the pulse actuating signal is smaller than a predetermined upper limit 70%. When the "ON" duty of the pulse actuating signal is smaller than 70%, the processing of this routine is ended. When the "ON" duty of the pulse actuating signal is not smaller than 70%, the flow proceeds to step 108 to set the "ON" duty of the pulse actuating signal to the upper limit value 70%.

The purpose of providing steps 107 and 108 is to prevent hydraulic pressure control valve 27 from opening relief passage 51 unwantedly during the force-feeding stroke of plunger 6, in view of the possibility that hydraulic pressure control valve 27 may open relief passage 51 during the force-feeding stroke when the pulse actuating signal is excessively long.

On the other hand, if "Terr" is not larger than "0" in step 105, the flow proceeds to step 109 to make still another judgement to check whether "Terr" is smaller than "0". If "Terr" is smaller than "0", i.e. when the actual fuel injection timing is retarded with respect to the target fuel injection timing, the flow proceeds to step 110 to decrease the ratio of "ON" duty of the pulse actuating signal to advance the actual fuel injection timing, thereafter ending the procedure of this routine. When the judgement result of step 109 is "NO", i.e. "Terr"=0, the procedure of this routine is ended.

Figure 7:
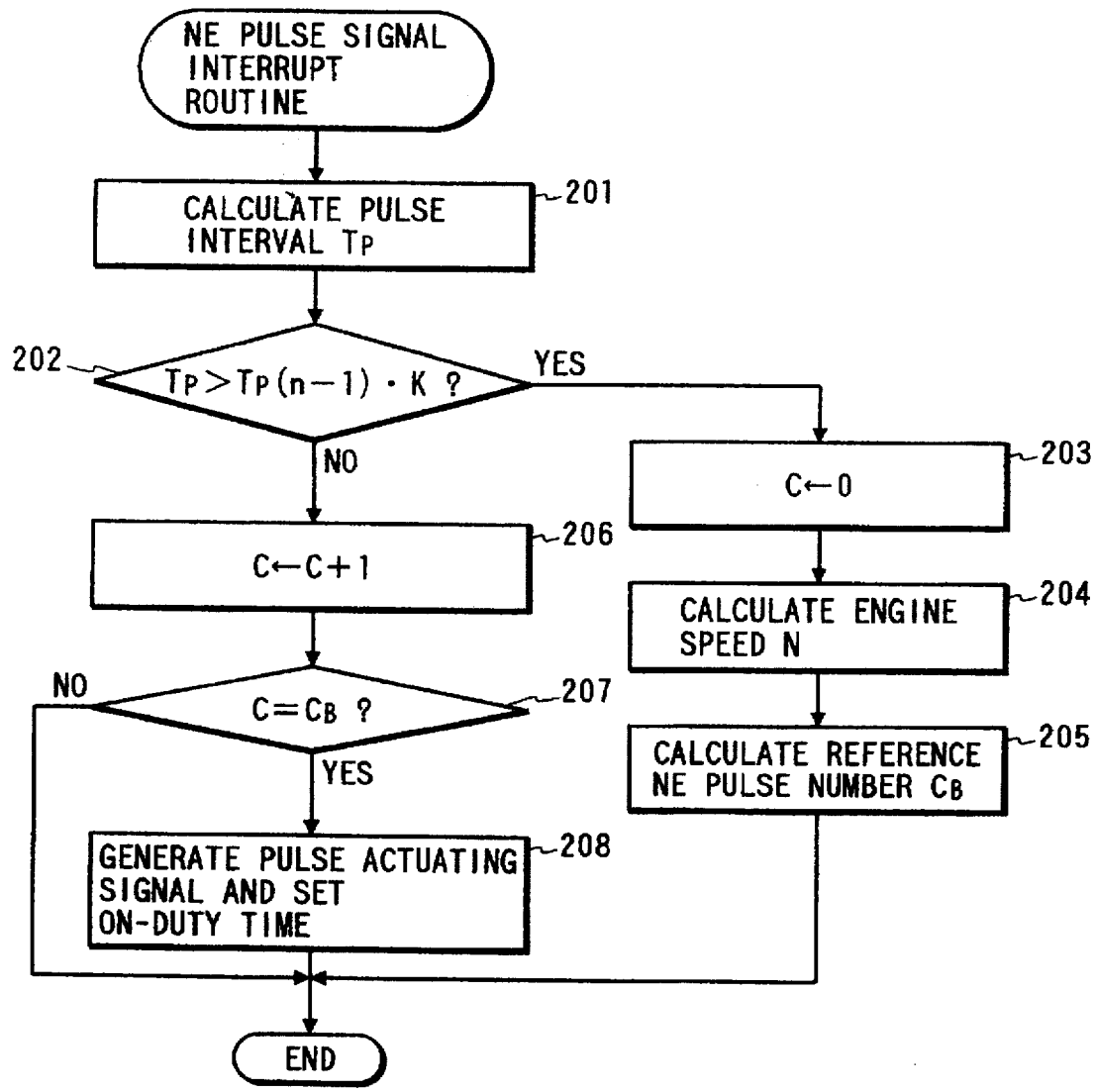
FIG. 7 is a flow chart showing an engine speed (NE) pulse signal interrupt routine in accordance with the first embodiment of the present invention.

FIG. 7 is a flow chart showing an engine speed (NE) pulse signal interrupt routine in accordance with the first embodiment of the present invention. This interrupt routine is executed in response to every output of NE signal obtained from rotational angle sensor 4, to generate a pulse actuating signal for opening or closing hydraulic pressure control valve 27.

Upon starting this interrupt routine, a pulse interval "Tp" of the rotational angle signal is calculated in step 201. The pulse interval "Tp" represents a time interval between a time the immediate previous interrupt routine is executed and a time the present interrupt routine is executed.

Next, a judgement is made in step 202 to check whether "Tp" is larger than "Tp(n−1)·K", where "Tp(n−1)" represents a pulse interval obtained in the immediate previous interrupt routine and "K" represents a constant. The purpose of providing this judgement is to check whether or not the presently detected rotational angle signal is a reference signal "A". This is based on the fact that the time interval between continuous two pulses is enlarged immediately before the reference signal "A" due to the presence of each cutout tooth formed on the signal rotor 3, as understood from FIG. 4B.

Accordingly, the pulse interval "Tp" corresponding to reference signal "A" becomes large compared with the pulse interval "Tp" corresponding to rotational angle signal "B", usually the former is 2.5 times as large as the latter.

In view of the above relationship, the present embodiment sets the value of constant "K" to 2.28. Thus, it becomes possible to detect the reference signal "A" by checking whether or not the relationship Tp>Tp(n−1)·K is satisfied.

When the step 202 judges that the presently detected rotational angle signal is not the reference signal "A", the flow proceeds to step 206.

On the other hand, when the reference signal "A" is detected in the step 202, the flow proceeds to step 203 wherein an NE pulse number "C" is cleared (i.e. reset to "0"). The NE pulse number "C" is used to detect the pulse actuating signal output timing used in the later-described processing. Then, the flow proceeds to step 204 to calculate the engine speed "N" based on the detecting signal obtained from rotational angle sensor 4. And, in step 205, a reference NE pulse number $C_B$ corresponding to the obtained engine speed "N" is calculated with reference to Table 1.

TABLE 1

| engine speed | $C_B$ |
| --- | --- |
| 0–1300 rpm | 10 |
| 1250–2550 rpm | 9 |
| 2500–3800 rpm | 8 |
| 3750–5050 rpm | 7 |
| 5000–6300 rpm | 6 |

In determine each range of the engine speed "N" in the table 1, an adequate hysteresis is provided between adjacent two engine regions. Therefore, some of engine speed "N", e.g. 1250–1300 rpm, 2500–2550 rpm, 3750–3800 rpm, and 5000–5050 rpm, belong two engine regions.

The pulse actuating signal is supplied to hydraulic pressure control valve 27 in accordance with this reference NE pulse number $C_B$. In the setting of reference NE pulse number $C_B$, the time lag of valve needle 52 (approximately 1.5 ms in this embodiment, as shown in FIG. 8) is taken into consideration. More specifically, due to the inertia mass of valve needle 52 of hydraulic pressure control valve 27, there is caused a delay between a generation of the pulse actuating signal and an actual movement of valve needle 52. Hence, in the setting of reference NE pulse number $C_B$, the time lag of valve needle 52 is taken into consideration, to ensure that hydraulic pressure control valve 27 opens relief passage 51 after finishing the force feeding operation of plunger 6. After finishing the step 205, the processing of this interrupt routine is ended.

When the step 202 does not detect reference signal "A" (i.e. "NO" in the Step 202), the flow proceeds to step 206 to increment the NE pulse number "C" by 1; i.e. C=C+1.

Then, a judgement is made in the next step 207 to check whether the present. NE pulse number "C" is equal to the reference NE pulse number "$C_B$". The purpose of providing this step 207 is to detect the arrival of the signal output timing for sending out the pulse actuating signal to hydraulic pressure control valve 27. If "C" is not equal to "$C_B$" in step 207, the processing of this interrupt routine is ended.

On the other hand, when "C" is equal to "$C_B$" in step 207, it indicates the arrival of the signal output timing for sending out the pulse actuating signal to hydraulic pressure control valve 27. Thus, the flow proceeds to step 208 wherein actuating circuit 42 generates the pulse actuating signal. At the same time, the duty-ON time is calculated and set in the step 208 based on the ratio of ON-DUTY obtained in step 106, 108 or 110 and the engine speed "N". Then, the processing of this routine is ended.

Figure 8:
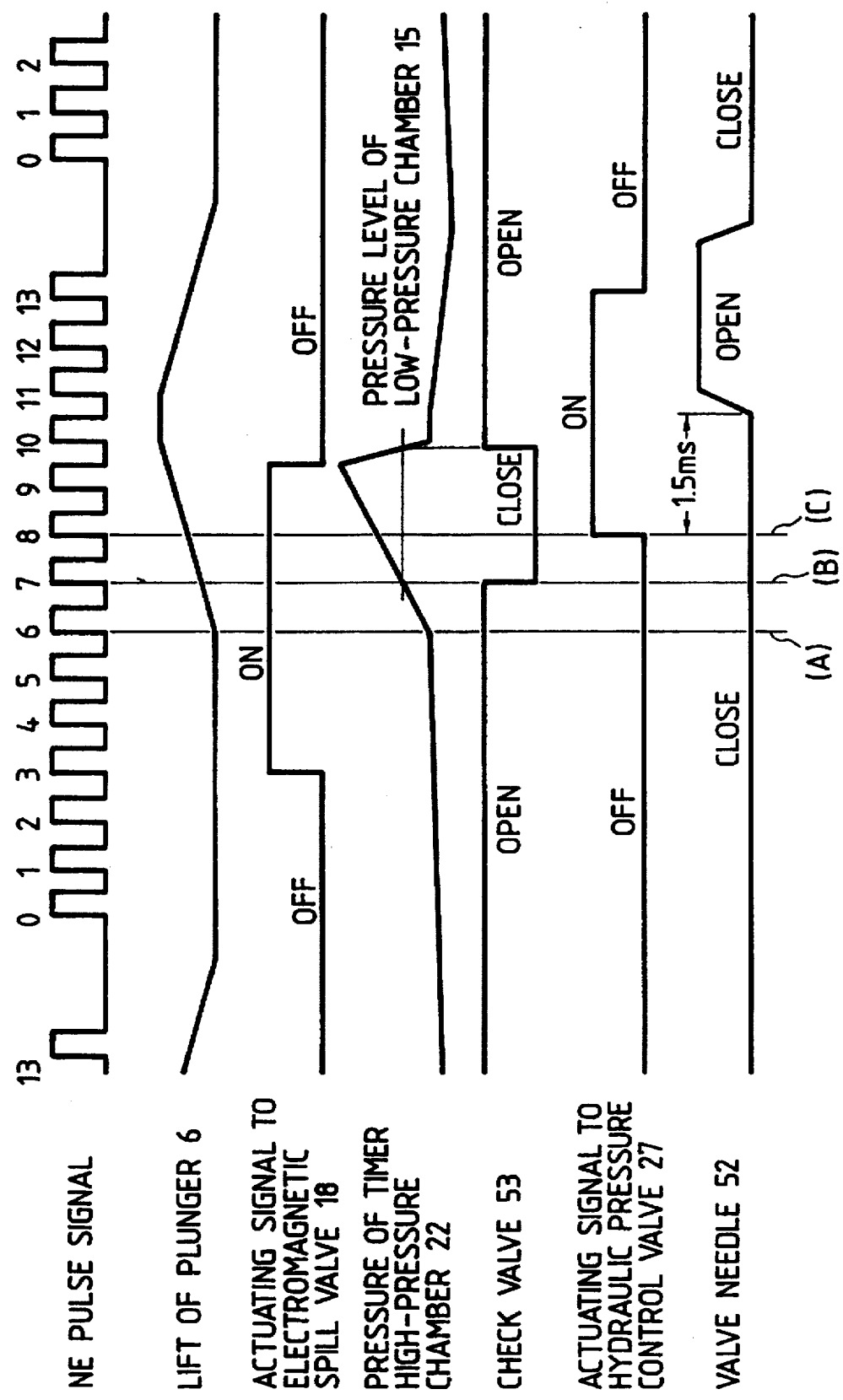
FIG. 8 is a time chart showing the operation of the fuel injection timing control system in accordance with the first embodiment of the present invention.

FIG. 8 is a time chart showing the operation of the fuel injection timing control system in accordance with the first embodiment of the present invention. In this time chart, the engine speed "N" is 3,000 rpm, i.e. N=3,000, and the force feeding stroke or duration of plunger 6 is set in the range of 6 to 10 of NE pulse number "C".

When NE pulse number "C" is "0", reference NE pulse number $C_B$ is obtained in the step 205 of the flow chart shown in FIG. 7. For example, as the engine speed "N" is 3000 rpm in this embodiment, TABLE 1 provides $C_B$=8. Then, electromagnetic spill valve 18 is activated, and thereafter plunger 6 starts the force feeding stroke by increasing its lifting amount (i.e., timing A in FIG. 8).

Upon entering the force feeding stroke, the timer high-pressure chamber 22 gradually increases the pressure in proportion to the lift amount of plunger 6. At the moment the pressure of timer high-pressure chamber 22 exceeds the pressure of low-pressure chamber 15 (i.e. timing B in FIG. 8), check valve 53 closes relief passage 50. At this moment, hydraulic pressure control valve 27 closes the other relief passage 51. Therefore, timer high-pressure chamber 22 is a completely closed space which locks the timer piston 21 and prevent the fuel injection pressure from being lowered.

When NE pulse number "C" is equal to 8, i.e. C=8, hydraulic pressure control valve 27 is activated through the steps 207 and 208 of the flow chart shown in FIG. 7, and the duty-ON time is determined (i.e. timing C in FIG. 8).

After that, electromagnetic spill valve 18 is deactivated to stop the injection. Responsively, timer high-pressure chamber 22 shows a steep reduction of its pressure. When the pressure of timer high-pressure chamber 22 falls below the pressure of low-pressure chamber 1, check valve 53 opens relief passage 50. The actual timing of valve needle 52 shifting to its open position in response to the activation of hydraulic pressure control valve 27 is delayed approximately 1.5 msec due to inertia mass of valve needle 52 itself, as described above.

As described above, the present embodiment assures that both of check valve 53 and hydraulic pressure control valve 27 close their corresponding relief passages 50 and 51 during the force feeding stroke of plunger 6 so as to completely close the space of timer high-pressure chamber 22, thereby preventing the fuel-injection pressure from being undesirably lowered due to torque reaction force.

In other words, the timing for generating the pulse actuating signal fed to hydraulic pressure control valve 27 is in synchronism with a termination of the force feeding stroke of the fuel injection pump.

Although the present embodiment uses TABLE 1 to control the open timing of hydraulic pressure control valve 27, it will be possible to replace TABLE 1 by another table or map. For example, it will be desirable that hydraulic pressure control valve 27 necessarily opens relief passage 51 if NE pulse number exceeds "9" in the time chart of FIG. 8 when NE pulse number "9" corresponds to the maximum fuel injection amount. The lift amount of plunger 6 is normally set larger than the amount practically required. Thus, it is rare that the full stroke of plunger 6 is used for the ordinary fuel injection.

Second Embodiment

The second embodiment of the present invention will be explained with reference to FIG. 9.

Figure 9:
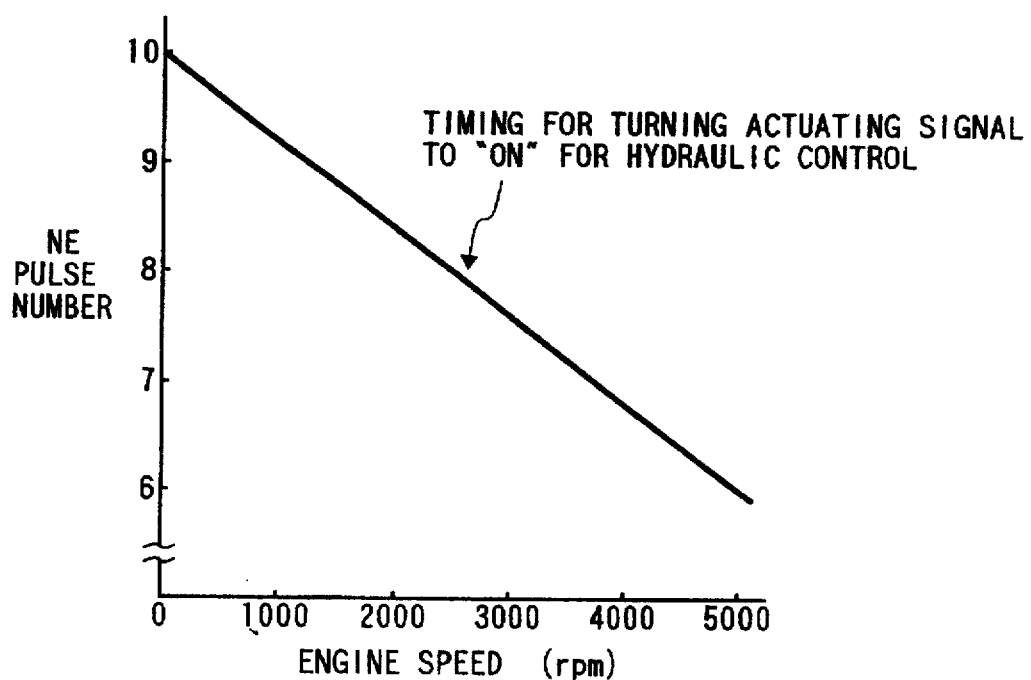
FIG. 9 is a graph showing characteristics of a second embodiment of the present invention.

The second embodiment is substantially the same as the first embodiment except that the signal output timing for sending out the pulse actuating signal to hydraulic pressure control valve 27 is continuously varied in accordance with the engine speed as shown in FIG. 9.

According to this second embodiment, the valve open timing of hydraulic pressure control valve 27 is always and accurately controlled to meet the termination of force feeding stroke of plunger 6 (i.e. the timing corresponding to NE pulse number "C"=10). It is advantageous in that the fuel injection is stabilized.

Another Fuel Injection System Applicable to This Invention

Figure 10:
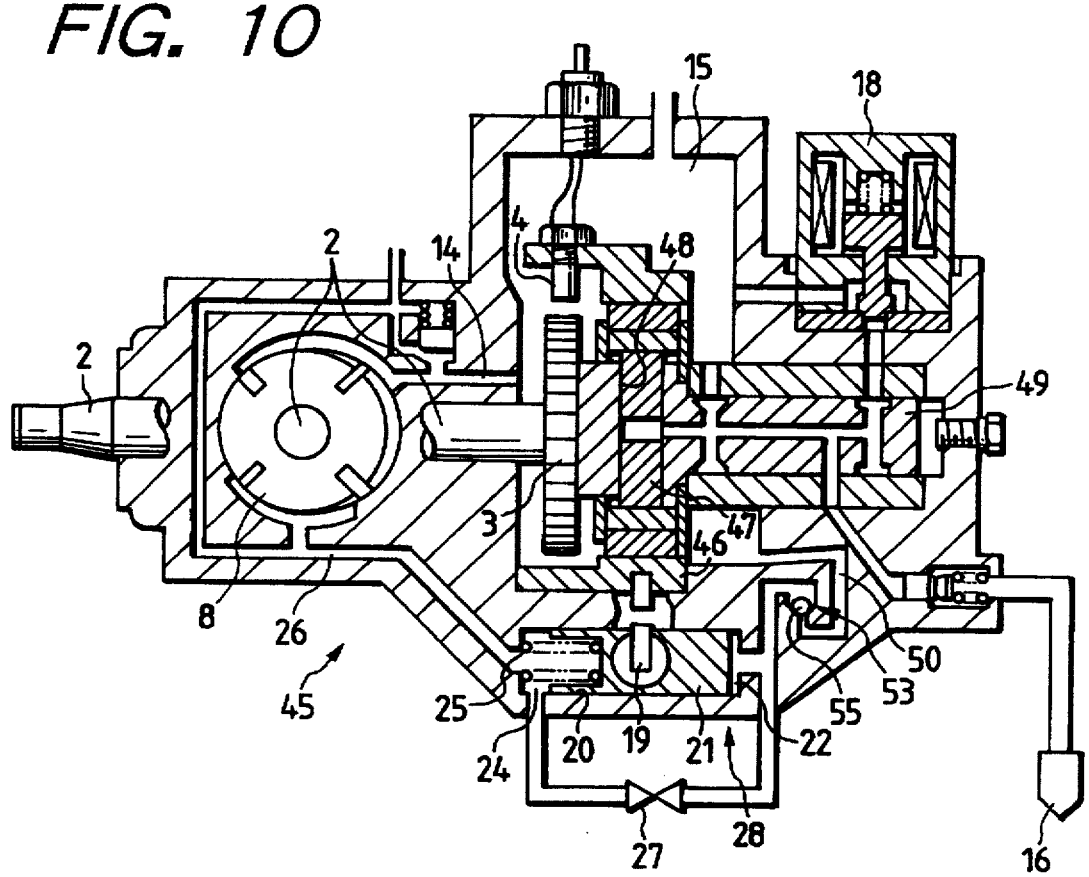
FIG. 10 is a cross-sectional view showing an overall arrangement of an inner cam force-feeding & distribution type fuel injection pump and an associated fuel injection timing control apparatus applicable to the present invention.

FIG. 10 is a cross-sectional view showing an overall arrangement of an inner cam force-feeding & distribution type fuel injection pump 45 and an associated fuel injection timing control apparatus applicable to the present invention.

In FIG. 10, an inner cam 46 is linked through slide pin 19 to timer piston 21. Thus, the balancing point between the hydraulic pressure of timer high-pressure chamber 22 and the resilient force of spring member 25 determines the fuel injection timing. A ring holding inner cam 46 or this holding cam 46 itself has substantially the same function as that of the roller ring 10 in the face cam force-feeding & distribution type fuel injection pump 1 of FIG. 2. The check valve 53, constituted by a ball 53, is provided as an essential component in the same manner as the above-described embodiment (FIG. 2).

The structural features of inner cam force-feeding & distribution type fuel injection pump different from face cam force-feeding & distribution type fuel injection pump is that there are provided a plurality of plungers 47 provided radially inside inner cam 46 and rotatable in synchronism with drive shaft 2, and causing reciprocative motion along a cam profile formed on the inside surface of cam 46 to pressurize the fuel, and a rotary valve 49 integral with a cylinder 48 accommodating plungers 47 and not moving in the axial direction thereof but rotating about this axis. Such structural features of inner cam force-feeding & distribution type fuel injection pump are conventionally well known.

Third Embodiment

The third embodiment of the present invention will be explained with reference to FIGS. 11 through 19 hereinafter.

The third embodiment is different from the first embodiment in that the actuating signal output to hydraulic pressure control valve 27 is selectively controlled in accordance with the engine speed. More specifically, the pulse output timing or the actuating signal to hydraulic pressure control valve 27 is controlled by an engine speed sync control when the engine speed is in a low engine speed region and is switched to a constant interval control when the engine speed is in a high engine speed region.

Namely, the third embodiment is characterized in that pulse output timing of the actuating signal to hydraulic control valve is synchronized with the engine speed within a limited region lower than a predetermined value.

The reason why the engine speed sync control for the actuating signal output control is limited to a predetermined low engine speed region is as follows.

As described above, due to inertia mass of valve needle 52 itself, there is caused a delay between a generation of the pulse actuating signal and an actual movement of valve needle 52. According to the present embodiment, such a delay or time lag will be in an order of approximately 1.5 msec, which is of course constant irrespective of the engine speed.

Meanwhile, the crank angle rotatable during such a delay time varies in proportion to the engine speed. For example, it will be readily understood, if the drive shaft 2 rotates $\Theta$ CA° during the time interval of 1.5 msec at the engine speed of 1000 rpm, the crank angle will be increased to $2\Theta$ CA° when the engine speed is increased to 2000 rpm.

What is meant by the above fact is that the problem of time delay or time lag of valve needle 52 of the hydraulic pressure control valve. 27 becomes serious with increasing engine speed. More specifically, when the crank angle corresponding to the delay between actual valve-open timing of hydraulic pressure control valve 27 and the corresponding fuel injection timing is increased with increasing engine speed, there is the possibility that the actual valve-open timing of hydraulic pressure control valve 27 is completely overlapped with the next fuel injection timing at specific speeds in the high engine speed region, resulting in undesirable fuel injection pressure.

In view of the above, the third embodiment intends to eliminate such a problem caused in the high speed region, while ensuring that the fuel injection caused by force-feeding stroke of plunger 6 is not overlapped with the actual valve-open duration of hydraulic pressure control valve 27 in the low engine speed region.

Figure 11:
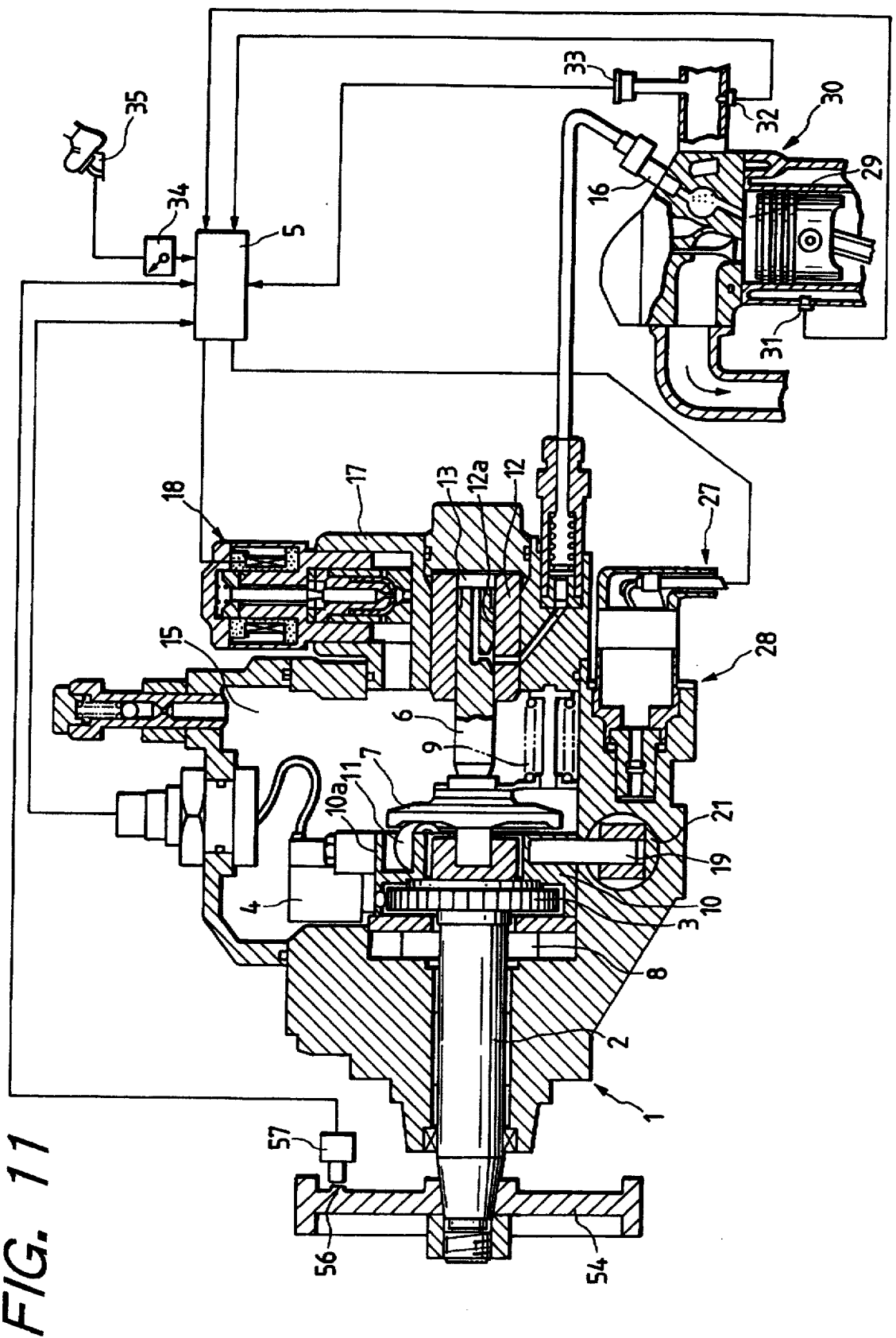
FIG. 11 is a cross-sectional view showing an overall arrangement of a face cam force-feeding & distribution type fuel injection pump and an associated fuel injection timing control system in accordance with a third embodiment of the present invention.
Figure 12:
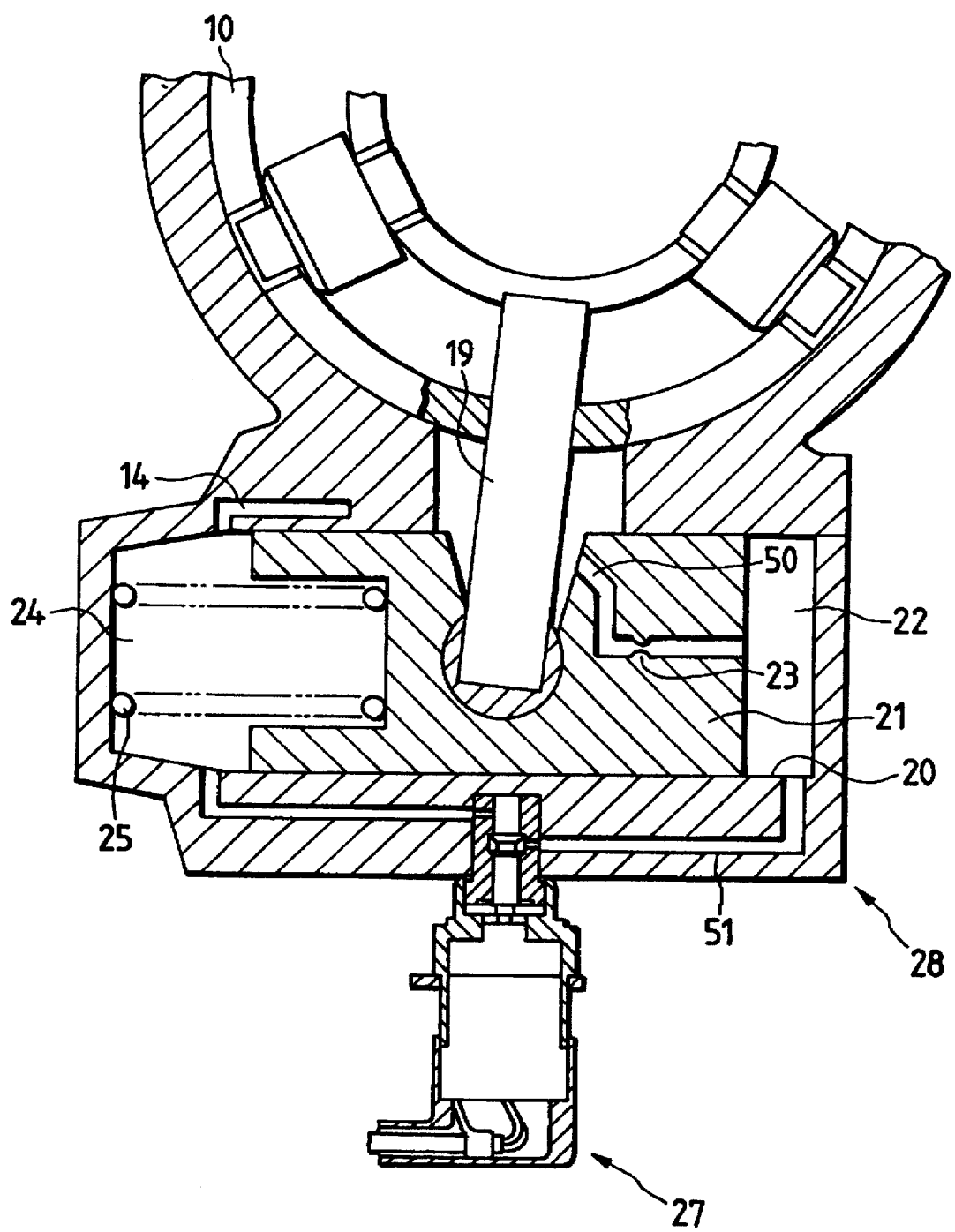
FIG. 12 is a cross-sectional view shoring the details of a timer apparatus incorporated in the fuel injection pump in accordance with the third embodiment of the present invention.

FIG. 11 is a cross-sectional view showing an overall arrangement of a face cam force-feeding & distribution type fuel injection pump and an associated fuel injection timing control system in accordance with the third embodiment of the present invention. FIG. 12 is a cross-sectional view showing the details of a timer apparatus incorporated in the fuel injection pump shown in FIG. 11.

Although the first embodiment includes the check valve 53 constituted by ball 55, the third embodiment can omit the check valve 53 as shown in FIG. 12. Other structural or hardware arrangement of the third embodiment is substantially the same as that of the first embodiment, and therefore will not be explained hereinafter.

Figure 13:
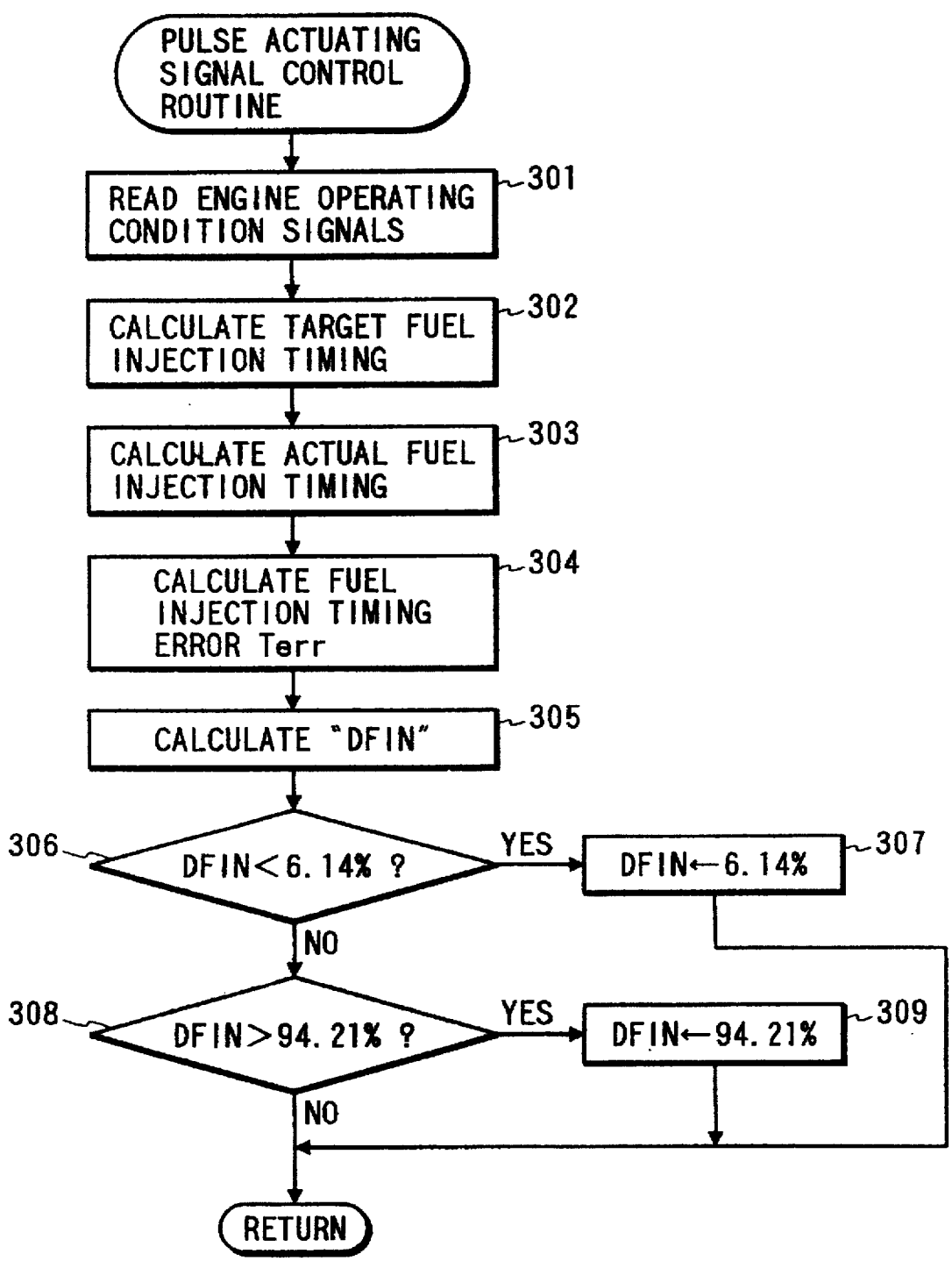
FIG. 13 is a flow chart showing a pulse actuating signal control routine in accordance with the third embodiment of the present invention.

FIG. 13 is a flow chart showing a pulse actuating signal control routine in accordance with the third embodiment of the present invention. This control routine is repeatedly executed in electronic control unit 5 to perform the feedback control of the duty ratio of the pulse actuating signal supplied to hydraulic pressure control valve 27, so that the fuel injection timing of diesel engine 30 is adjusted to a target or optimum fuel injection timing determined based on the operating conditions of diesel engine 30.

Upon starting this routine, the operating conditions of diesel engine 30 are checked in step 301 by reading the detection signals from cooling water temperature sensor 31, intake air temperature sensor 32, intake air pressure sensor 33 and accelerator sensor 34.

Next, in step 302, a target fuel injection timing is calculated based on engine speed "N" calculated in a later-described routine and the data representing the engine operating conditions read in step 301. First of all, a fundamental fuel injection timing is calculated using the parameters of engine speed "N" and the depression amount of the accelerator pedal 35 detected by accelerator sensor 34. Thereafter, the fundamental fuel injection timing is corrected by the values of cooling water temperature "THW", intake air temperature "Ta", intake air pressure "Pa" and others, thereby finally obtaining the target fuel injection timing.

Subsequently, in step 303, an actual fuel injection timing is calculated based on the detection signals from TDC sensor 57 and rotational angle sensor 4. More specifically, the start timing of the fuel injection can be known from the detection signal of rotational angle sensor 4, while TDC sensor 57 generates the signal representing the crank angle. Hence, by detecting the signals of rotational angle sensor 4 and TDC sensor 57, the actual fuel injection timing can be calculated in relation to the crank angle of diesel engine 30.

Thereafter, in step 304, a fuel injection timing error "Terr" is calculated as a difference between the target fuel injection timing obtained in step 302 and the actual fuel injection timing obtained in step 303.

Figure 16:
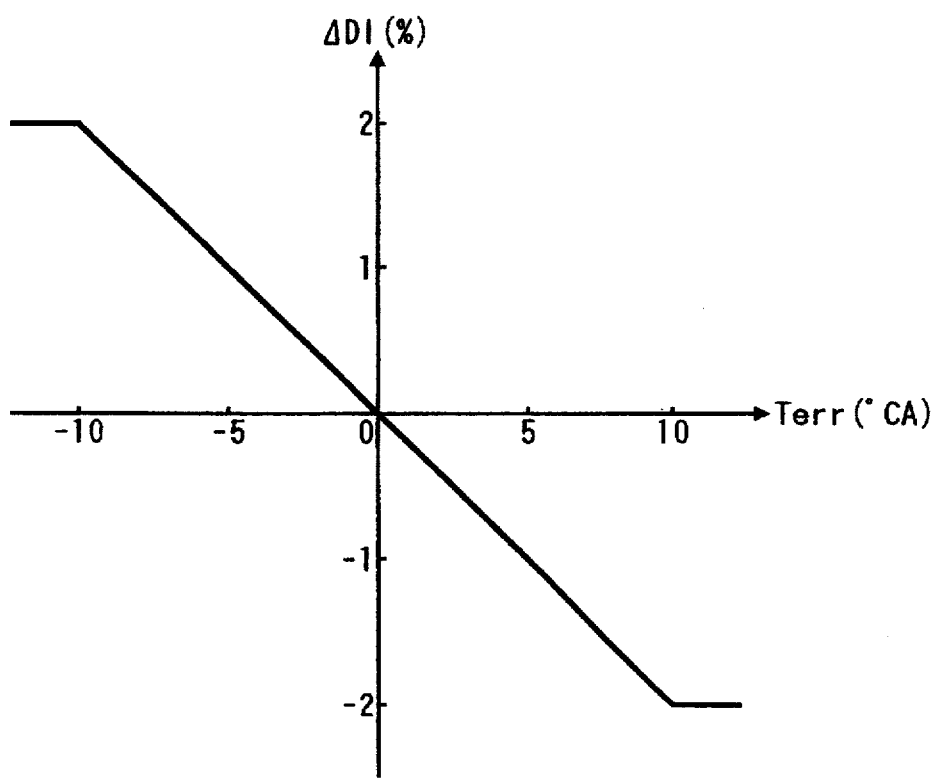
FIG. 16 is a graph showing a relationship between a correction value for an integral term and a fuel injection timing error, used in the calculation of the ON-duty ratio of the pulse actuating signal, in accordance with the third embodiment of the present invention.
Figure 17:
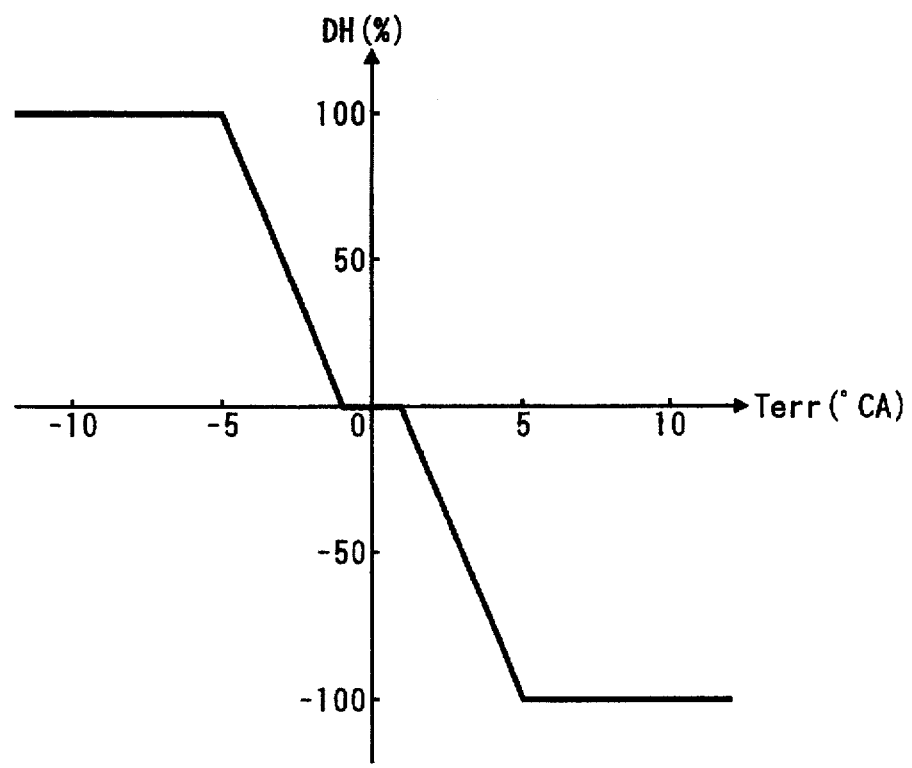
FIG. 17 is a graph showing a relationship between a proportional term and the fuel injection timing error, used in the calculation of the ON-duty ratio of the pulse actuating signal, in accordance with the third embodiment of the present invention.

Then, in step 305, the ON-duty ratio of the pulse actuating signal, represented by "DFIN" in the flow chart of FIG. 13, is calculated using the following formula.

$$DFIN(\%)=DI(\%)+DH(\%)$$

where, "DI" represents an integral term and "DH" represents a proportional term. And, the integral term "DI" is obtained from the following formula.

$$DI(n)=DI(n-1)+\Delta DI$$

where, "DI(n)" represents the present-cycle integral term, and "DI(n−1)" represents the one-cycle previous integral term. The value of "$\Delta DI$", i.e. the correction value of integral term "DI", is obtained from FIG. 16 showing a relationship between "Terr" and "$\Delta DI$". Meanwhile, the value of proportional term "DH" is obtained from FIG. 17 showing a relationship between "Terr" and "DH".

Subsequently, a judgement is made in step 306 to check whether "DFIN" is smaller than a predetermined lower limit "6.14%". If "DFIN" is smaller than "6.14%", the flow proceeds to step 307 to set the value of "DFIN" to "6.14%", thereafter ending the processing of this routine.

When "DFIN" is equal to or larger than "6.14%" in step 305, another judgement is made in step 308 to check whether "DFIN" is larger than a predetermined upper limit "94.21%". If "DFIN" is equal to or smaller than "94.21%", the flow ends the processing of this routine. On the other hand, when "DFIN" is larger than "94.21%", the flow proceeds to step 509 to set the value of "DFIN" to "94.21%", thereafter ending the processing of this routine.

Figure 14:
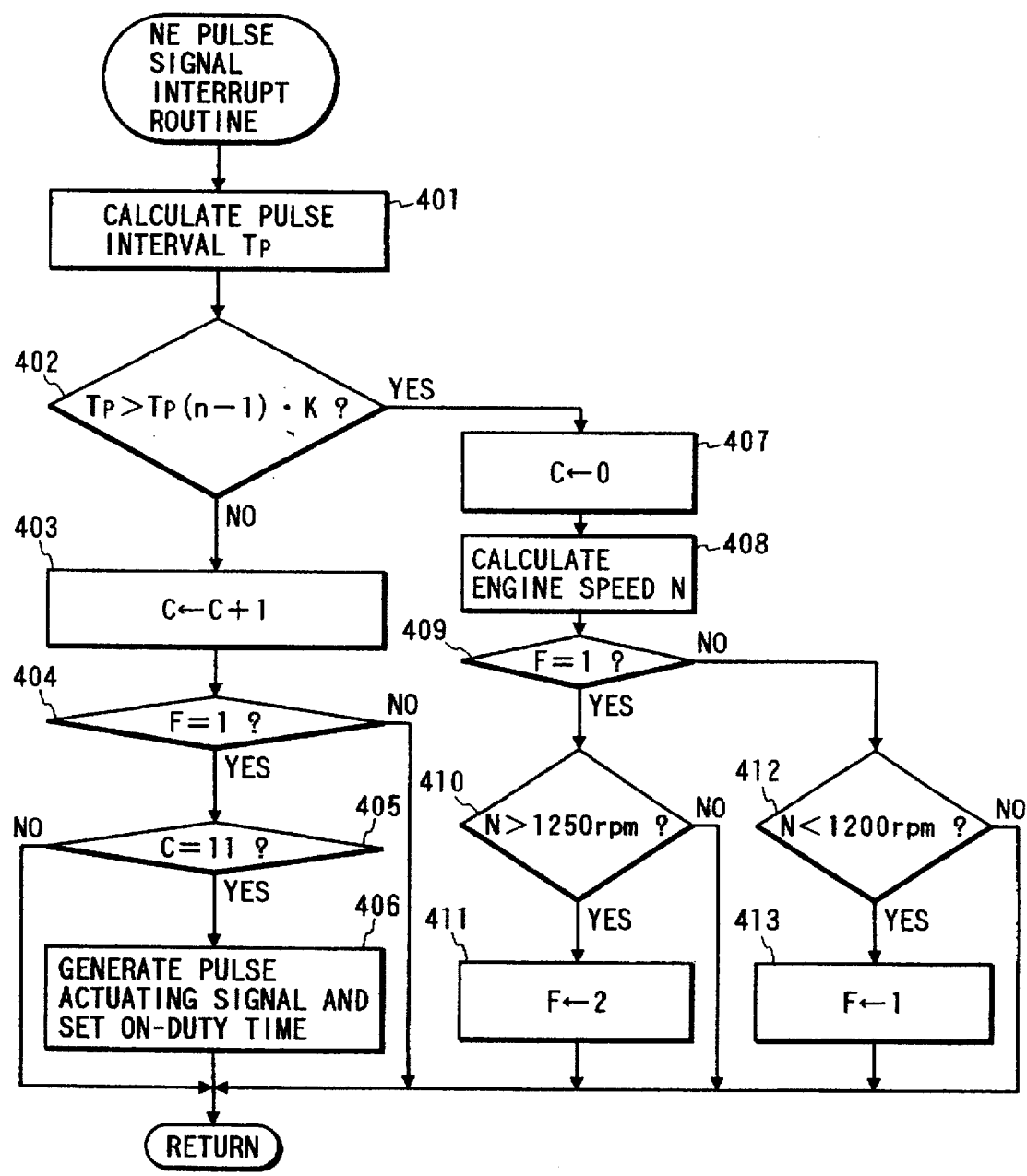
FIG. 14 is a flow chart showing an engine speed (NE) pulse signal interrupt routine in accordance with the third embodiment of the present invention.

FIG. 14 is a flow chart showing an engine speed (NE) pulse signal interrupt routine in accordance with the third embodiment of the present invention. This interrupt routine is executed in response to every output of NE signal obtained from rotational angle sensor 4, to generate a pulse actuating signal for opening or closing hydraulic pressure control valve 27.

Upon starting this interrupt routine, a pulse interval "Tp" of the rotational angle signal is calculated in step 401. The pulse interval "Tp" represents a time interval between a time the immediate previous interrupt routine is executed and a time the present interrupt routine is executed.

Next, a judgement is made in step 402 to check whether "Tp" is larger than "Tp(n−1)·K", where "Tp(n−1)" represents a pulse interval obtained in the immediate previous interrupt routine and "K" represents a constant. The purpose of providing this judgement is to check whether or not the presently detected rotational angle signal is the reference signal "A". This is based on the fact that the time interval between continuous two pulses is enlarged immediately before the reference signal "A" due to the presence of each cutout tooth formed on the signal rotor 3, as explained with reference to FIG. 4B.

Accordingly, the pulse interval "Tp" corresponding to reference signal "A" becomes large compared with the pulse interval "Tp" corresponding to rotational angle signal "B", usually the former is 2.5 times as large as the latter.

In view of the above relationship, the present embodiment sets the value of constant "K" to 2.28. Thus, it becomes possible to detect the reference signal "A" by checking whether or not the relationship Tp>Tp(n−1)·K is satisfied.

When the step 402 judges that the presently detected rotational angle signal is not the reference signal "A", the flow proceeds to step 403.

On the other hand, when the reference signal "A" is detected in the step 402, the flow proceeds to step 407 wherein an NE pulse number "C" is cleared (i.e. reset to "0"). The NE pulse number "C" is used to detect the pulse actuating signal output timing used in the later-described processing. Then, the flow proceeds to step 408 to calculate the engine speed "N" based on the detecting signal obtained from rotational angle sensor 4.

Subsequently, in step 409, a judgement is made to check the value of a flag "F" which is used to select the control of hydraulic pressure control valve 27 between the engine speed sync control and the constant interval control. More specifically, when the value of flag "F" is "1" in step 409, the flow proceeds to step 410 to further make a judgement as to whether the engine speed "N" is larger than 1250 rpm.

When the engine speed "N" is equal to or smaller than 1250 rpm, the processing of this routine is ended. On the other hand, when the engine speed "N" is larger than 1250 rpm, the flow proceeds to step 411 to renew the value of flag "F" to "2", thereafter ending the processing of this routine.

Meanwhile, when the value of flag "F" is not "1" in step 409, the flow proceeds to step 412 to further make a judgement as to whether the engine speed "N" is smaller than 1200 rpm. When the engine speed "N" is equal to or larger than 1200 rpm, the processing of this routine is ended. On the other hand, when the engine speed "N" is smaller than 1200 rpm, the flow proceeds to step 413 to renew the value of flag "F" to "1", thereafter ending the processing of this routine.

When the step 402 does not detect reference signal "A" (i.e. "NO" in the step 402), the flow proceeds to step 403 to increment the NE pulse number "C" by 1; i.e. C=C+1.

Then, a judgement is made in the next step 404 to check whether the flag "F" is equal to "1". When the flag "F" is not "1", the processing of this routine is ended. When the flag "F" is equal to "1", the flow proceeds to step 405.

In step 405, another judgement is further made to check the present ME pulse number "C" is equal to "11". The purpose of providing this step 405 is to detect the arrival of the signal output timing for sending out the pulse actuating signal to hydraulic pressure control valve 27. If "C" is not equal to "11" in step 405, the processing of this interrupt routine is ended.

On the other hand, when "C" is equal to "11" in step 405, it indicates the arrival of the signal output timing for sending out the pulse actuating signal to hydraulic pressure control valve 27. Thus, the flow proceeds to step 406 wherein actuating circuit 42 generates the pulse actuating signal. At the same time, the duty-ON time is calculated and set in the seep 406 based on the ratio of "DFIN" obtained in step 305, 307 or 309 and the engine speed "N". Then, the processing of this routine is ended.

What is meant by the value of flag "F" is as follows.

When "F" is "1", the hydraulic pressure control valve 27 is controlled in synchronism with the engine speed "N" by checking the arrival of fuel injection timing using the NE pulse number "C" as explained in the steps 404 through 406. According to this third embodiment, the flag "F" is set to "1" when the engine speed is less than 1200 rpm. In other words, the third embodiment of the present invention performs the engine speed sync control for hydraulic pressure control valve 27 when the engine speed is in the predetermined low speed region.

Figure 15:
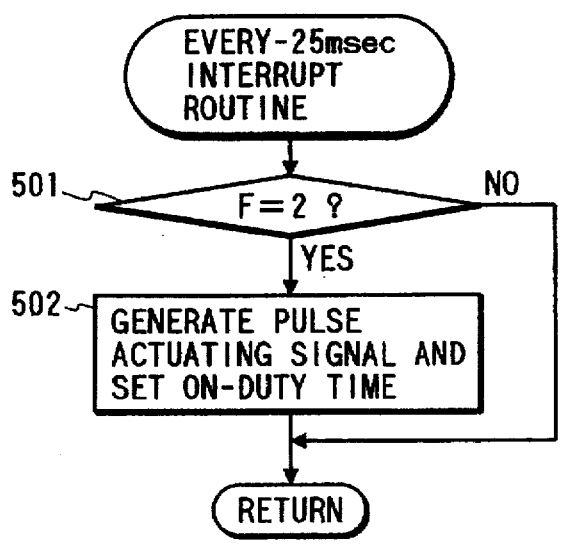
FIG. 15 is a flow chart showing a constant-interval interrupt routine for generating a pulse actuating signal performed irrespective of engine speed in accordance with the third embodiment of the present invention.

On the contrary, when "F" is "2", the hydraulic pressure control valve 27 is controlled at constant intervals of, for example, 40 Hz. FIG. 15 is a flow chart showing such a constant-interval interrupt routine performed irrespective of engine speed "N". This routine is started every 25 msec. In step 501, a judgement is made to check whether the value of flag "F" is equal to "2". When the value of flag "F" is not equal to "2", the processing of this routine is ended. On the other hand, when the value of flag "F" is equal to "2", the flow proceeds to step 502.

In step 502, actuating circuit 42 generates the pulse actuating signal. At the same time, the duty-ON time is calculated and set in the step 502 based on the ratio of "DFIN" obtained in step 305, 307 or 309 and the engine speed "N". Then, the processing of this routine is ended.

As explained above, the third embodiment of the present invention performs the constant interval control for hydraulic pressure control valve 27 irrespective of engine speed "N" when "F" is "2", as explained in the steps 501 and 502 of FIG. 15. According to this third embodiment, the flag "F" is set to "2" when the engine Speed is larger than 1250 rpm. In short, the third embodiment of the present invention performs the constant interval control when the engine speed is in the predetermined high speed region.

Figure 18:
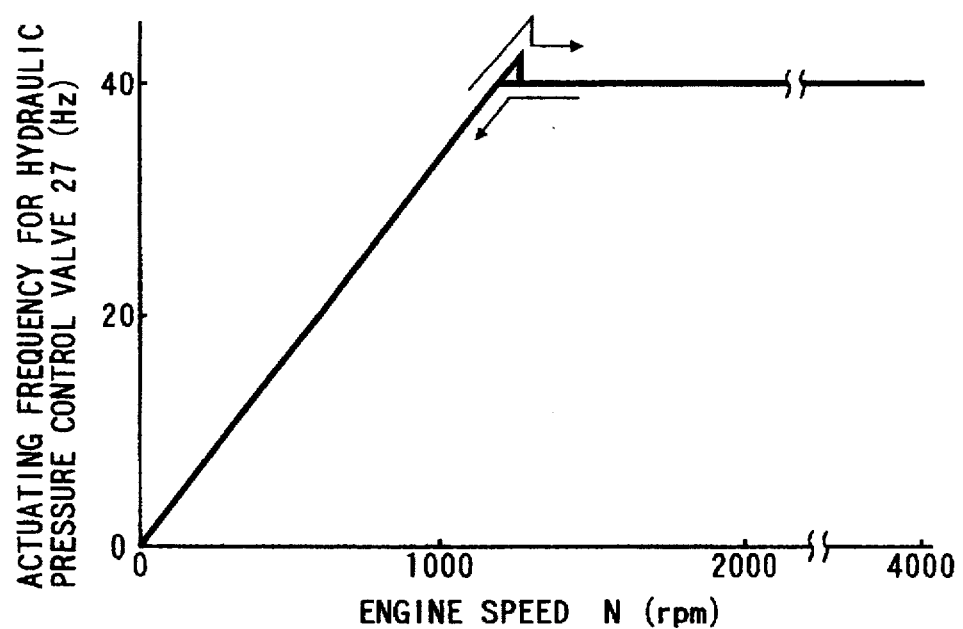
FIG. 18 is a graph showing the relationship between the engine speed and an actuating frequency of hydraulic pressure control valve in accordance with the third embodiment of the present invention.

FIG. 18 is a graph showing the relationship between engine speed "N" and the actuating frequency of hydraulic pressure control valve 27. As shown in FIG. 18, the actuating frequency of hydraulic pressure control valve 27 increases in proportion to engine speed "N" until engine speed "N" reaches 1250 rpm, and is maintained at 40 Hz after engine speed "N" exceeds 1250 rpm. On the other hand, the actuating frequency of hydraulic pressure control valve 27 is maintained at 40 Hz until engine speed "N" falls below 1200 rpm, and decreases in proportion to engine speed "N". As understood from the foregoing description, a hysteresis of 500 rpm is provided between 1200 rpm and 1250 rpm, for preventing so-called hunting operation of the control system.

Figure 19:
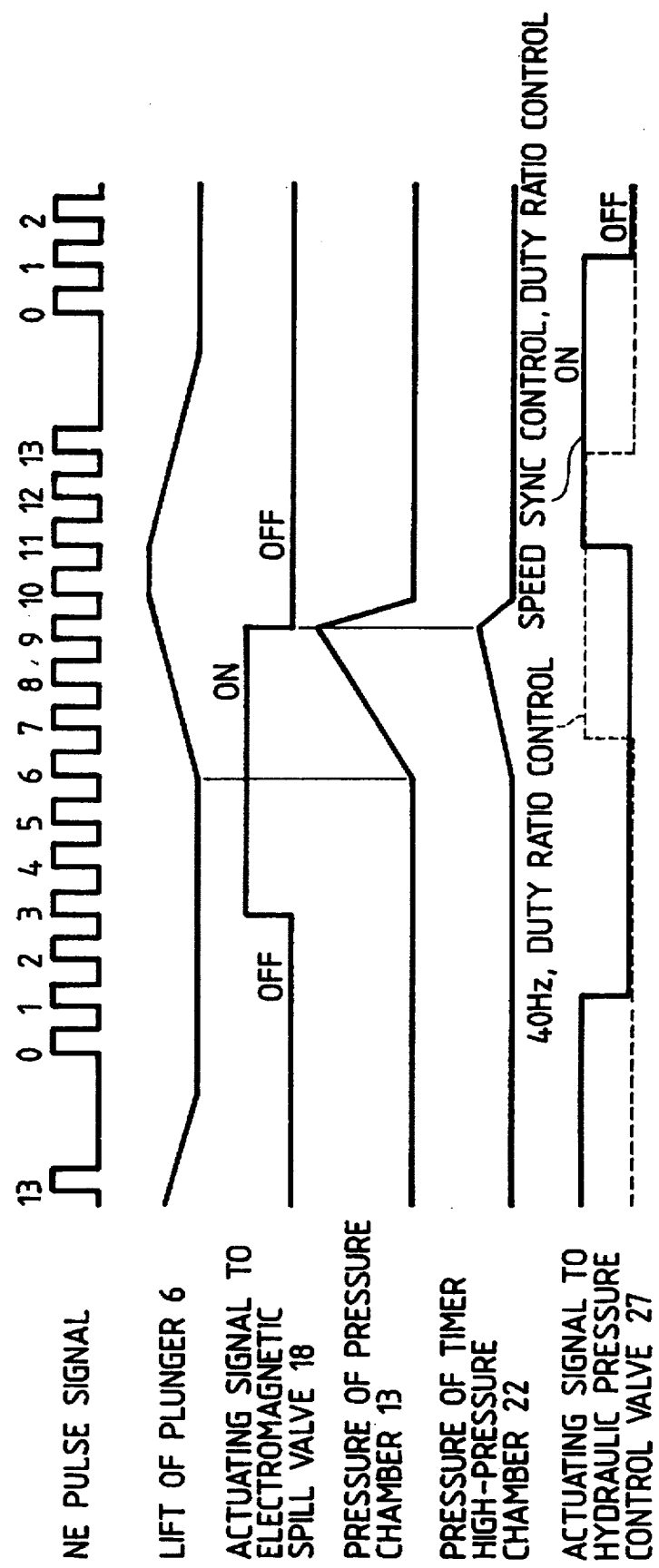
FIG. 19 is a time chart showing the operation of the fuel injection timing control system in accordance with the third embodiment of the present invention.

FIG. 19 is a time chart showing the operation of the fuel injection timing control system in accordance with the third embodiment of the present invention. As shown in FIG. 19, after entering the force feeding stroke of plunger 6, the hydraulic pressure in pressure chamber 13 increases in proportion to the lift amount of plunger 6. Hence, face cam 7 receives the increased hydraulic pressure acting from pressure chamber 13 as a torque reaction force. This torque reaction force is transmitted to timer piston 21 through roller ring 10 and slide pin 19, pressing timer piston right in FIG. 12.

Accordingly, the hydraulic pressure in timer high-pressure chamber 22 increases gradually and in proportion to the lift amount of plunger 6, as shown in FIG. 19.

According to the engine-speed sync control of the third embodiment (performed in the low engine speed region), hydraulic pressure control valve 27 is surely closed during the force-feeding stroke of plunger 6 because an actuating signal is maintained at OFF condition during the force-feeding stroke and then, after completing the force-feeding stroke, the actuating signal is turned into ON condition and supplied to hydraulic pressure control valve 27.

Thus, the third embodiment of the present invention makes it possible to accurately control the hydraulic pressure control valve 27 especially in the low-engine speed region such as an idling condition where the combustion of fuel in each combustion chamber of diesel engine 30 is relatively unstable.

When the engine speed is increased up to the predetermined speed (1250 rpm), the control of hydraulic pressure control valve 27 is switched to the constant interval control (performed at constant intervals of 40 Hz irrespective of the value of engine speed "N"), although the actual fuel feed amount may be slightly changed due to the undesirable shift movement of timer piston 21 described previously if the "ON" actuating signal is supplied to hydraulic pressure control valve 27 within the force-feeding stroke, as indicated by a dotted line in FIG. 19.

However, when the engine speed is sufficiently larger, the operating condition of engine is stabilized. In other words, the slight change of the fuel feed amount will cause no problem in such a stabilized engine operating condition. Thus, the third embodiment of the present invention positively utilizes the constant interval control in the predetermined high engine-speed region. It is advantageous in that the requirement to hydraulic pressure control valve 27 in response and performance is not so severe, thereby allowing many of fuel injection pumps to employ the present invention.

Fourth Embodiment

The fourth embodiment of the present invention will be explained with reference to flow charts of FIGS. 20 through 23 together with graphs of FIGS. 16 and 17 hereinafter.

The fourth embodiment is different from the third embodiment in that the control of actuating signal supplied to hydraulic pressure control valve 27 is finely controlled by taking account of the depression amount of the accelerator pedal 35, thereby eliminating undesirable change of fuel injection timing and suppressing the shock occurring in the switching between the engine speed sync control performed in the low engine speed region and the constant-interval control performed in the high engine speed region.

The fourth embodiment of the present invention is applied to the face cam force-feeding & distribution type fuel injection pump and the associated fuel injection timing control system shown in FIGS. 11 and 12, or the inner cam force-feeding & distribution type fuel control injection system, for example, shown in FIG. 10. The structural or hardware arrangement of the fourth embodiment is substantially the same as that of the third embodiment.

Figure 20:
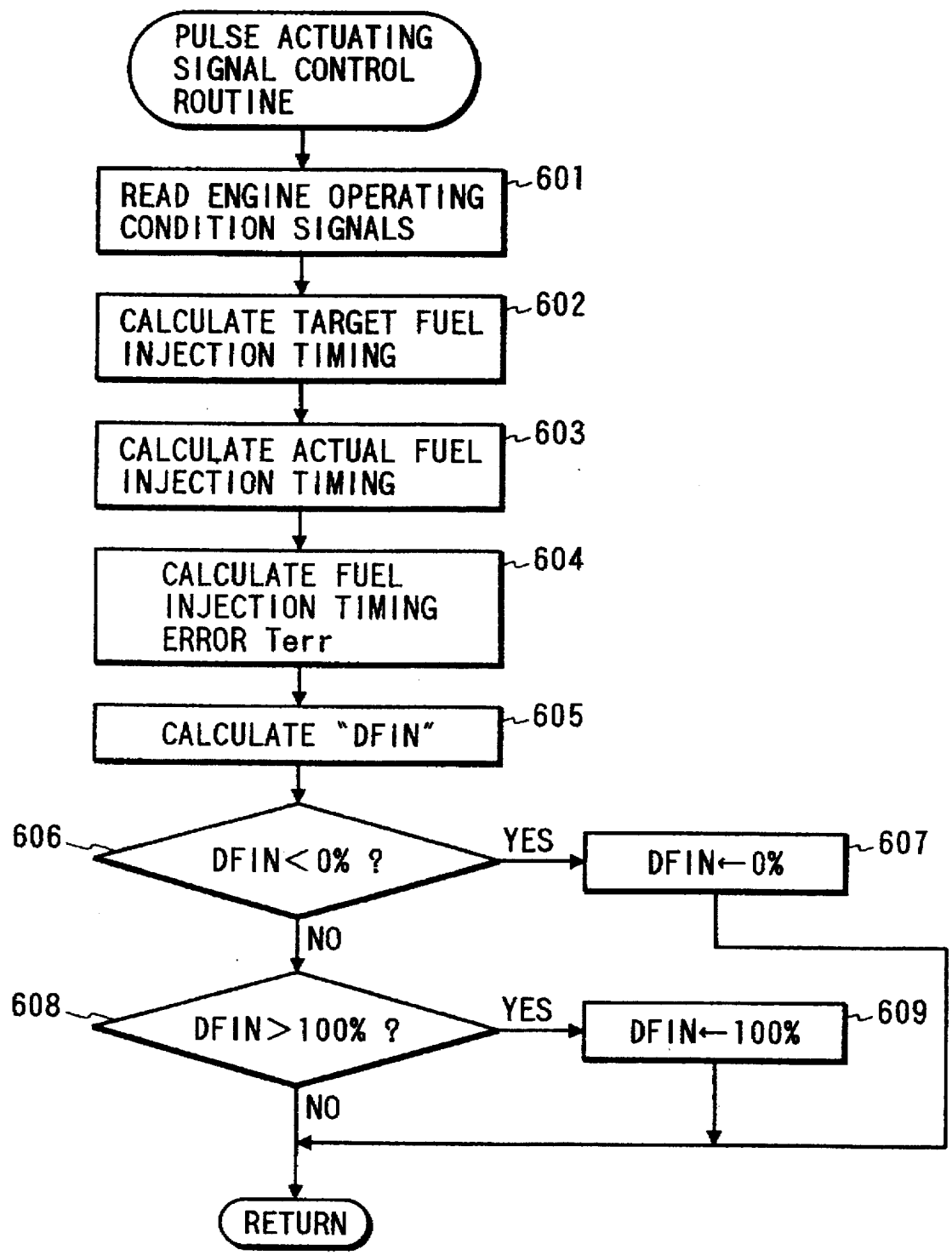
FIG. 20 is a flow chart showing a pulse actuating signal control routine in accordance with the fourth embodiment of the present invention.

FIG. 20 is a flow chart showing a pulse actuating signal control routine in accordance with the fourth embodiment of the present invention. This control routine is repeatedly executed in electronic control unit 5 to perform the feedback control of the duty ratio of the pulse actuating signal supplied to hydraulic pressure control valve 27, so that the fuel injection timing of diesel engine 30 is adjusted to a target or optimum fuel injection timing determined based on the operating conditions of diesel engine 30.

Upon starting this routine, the operating conditions of diesel engine 30 are checked in step 601 by reading the detection signals from cooling water temperature sensor 31, intake air temperature sensor 32, intake air pressure sensor 33 and accelerator sensor 34.

Next, in step 602, a target fuel injection timing is calculated based on engine speed "N" calculated in a later-described routine and the data representing the engine operating conditions read in step 601. First of all, a fundamental fuel injection timing is calculated using the parameters of engine speed "N" and the depression amount of the accelerator pedal 35 detected by accelerator sensor 34. Thereafter, the fundamental fuel injection timing is corrected by the values of cooling water temperature "THW", intake air temperature "Ta", intake air pressure "Pa" and others, thereby finally obtaining the target fuel injection timing.

Subsequently, in step 603, an actual fuel injection timing is calculated based on the detection signals from TDC sensor 57 and rotational angle sensor 4. More specifically, the start timing of the fuel injection can be known from the detection signal of rotational angle sensor 4, while TDC sensor 57 generates the signal representing the crank angle. Hence, by detecting the signals of rotational angle sensor 4 and TDC sensor 57, the actual fuel injection timing can be calculated in relation to the crank angle of diesel engine 30.

Thereafter, in step 604, a fuel injection timing error "Terr" is calculated as a difference between the target fuel injection timing obtained in step 602 and the actual fuel injection timing obtained in step 603.

Then, in step 605, the ON-duty ratio of the pulse actuating signal, represented by "DFIN" in the flow chart of FIG. 20, is calculated using the following formula.

$$DFIN(\%) = DI(\%) + DH(\%)$$

where, "DI" represents an integral term and "DH" represents a proportional term. And, the integral term "DI" is obtained from the following formula.

$$DI(n) = DI(n-1) + \Delta DI$$

where, "DI(n)" represents the present-cycle integral term, and "DI(n−1)" represents the one-cycle previous integral term. The value of "ΔDI", i.e. the correction value of integral term "DI", is obtained from FIG. 16 showing the relationship between "Terr" and "ΔDI". Meanwhile, the value of proportional term "DH" is obtained from FIG. 17 showing the relationship between "Terr" and "DH".

Subsequently, a judgement is made in step 606 to check whether "DFIN" is smaller than a predetermined lower limit "0%". If "DFIN" is smaller than "0%", the flow proceeds to step 607 to set the value of "DFIN" to "0%", thereafter ending the processing of this routine.

When "DFIN" is equal to or larger than "0%" in step 605, another judgement is made in step 608 to check whether "DFIN" is larger than a predetermined upper limit "100%". If "DFIN" is equal to or smaller than "100%", the flow ends the processing of this routine. On the other hand, when "DFIN" is larger than "100%", the flow proceeds to step 609 to set the value of "DFIN" to "100%", thereafter ending the processing of this routine.

The reason why steps 606 through 609 are required is that there is the necessity of providing the guard means for restricting the value of "DFIN" within a practical range (i.e. 0%–100%) because "DFIN" may exceed 100% or fall below 0% as a computational result.

Figure 21:
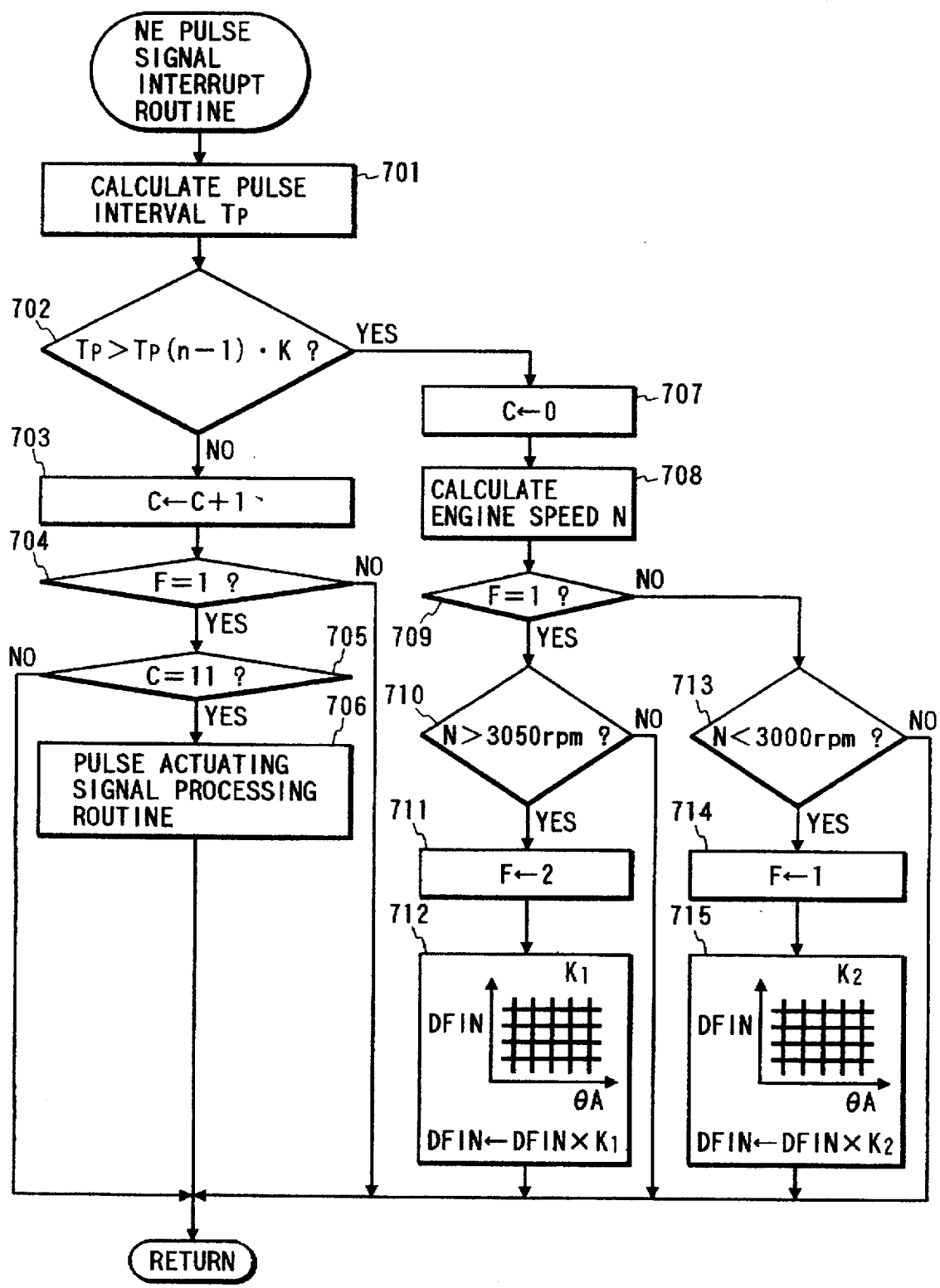
FIG. 21 is a flow chart showing an engine speed (NE) pulse signal interrupt routine in accordance with the fourth embodiment of the present invention.

FIG. 21 is a flow chart showing an engine speed (NE) pulse signal interrupt routine in accordance with the fourth embodiment of the present invention. This interrupt routine is executed in response to every output of NE signal obtained from rotational angle sensor 4, to generate a pulse actuating signal for opening or closing hydraulic pressure control valve 27.

Upon starting this interrupt routine, a pulse interval "Tp" of the rotational angle signal is calculated in step 701. The pulse interval "Tp" represents a time interval between a time the immediate previous interrupt routine is executed and a time the present interrupt routine is executed.

Next, a judgement is made in step 702 to check whether "Tp" is larger than "Tp(n−1)·K", where "Tp(n−1)" represents a pulse interval obtained in the immediate previous interrupt routine and "K" represents a constant. The purpose of providing this judgement is to check whether or not the presently detected rotational angle signal is the reference signal "A". This is based on the fact that the time interval between continuous two pulses is enlarged immediately before the reference signal "A" due to the presence of each cutout tooth formed on the signal rotor 3, as explained with reference to FIG. 4B.

Accordingly, the pulse interval "Tp" corresponding to reference signal "A" becomes large compared with the pulse interval "Tp" corresponding to rotational angle signal "B", usually the former is 2.5 times as large as the latter.

In view of the above relationship, the present embodiment sets the value of constant "K" to 2.28. Thus, it becomes possible to detect the reference signal "A" by checking whether or not the relationship Tp>Tp(n−1)·K is satisfied.

When the step 702 judges that the presently detected rotational angle signal is not the reference signal "A", the flow proceeds to step 703.

On the other hand, when the reference signal "A" is detected in the step 702, the flow proceeds to step 707 wherein an NE pulse number "C" is cleared (i.e. reset to "0"). The NE pulse number "C" is used to detect the pulse actuating signal output timing used in the later-described processing. Then, the flow proceeds to step 708 to calculate the engine speed "N" based on the detecting signal obtained from rotational angle sensor 4.

Subsequently, in step 709, a judgement is made to check the value of a flag "F" which is used to select the control of hydraulic pressure control valve 27 between the engine speed sync control and the constant interval control of 100 Hz. Regarding the actuating frequency (refer to FIG. 18) of hydraulic pressure control valve 27, it will be different depending on the performance of individual valves. In this respect, the hydraulic pressure control valve 27 used in the fourth embodiment has a quick response compared with that of the third embodiment.

More specifically, when the value of flag "F" is "1" in step 709, the flow proceeds to step 710 to further make a judgement as to whether the engine speed "N" is larger than 3050 rpm.

When the engine speed "N" is equal to or smaller than 3050 rpm, the processing of this routine is ended. On the other hand, when the engine speed "N" is larger than 3050 rpm, the flow proceeds to step 711 to renew the value of flag "F" to "2", thereafter proceeding to step 712.

In step 712, a first correction factor "K1" is obtained using a data map expressing the value of first correction factor "K1" in relation to the accelerator angle θA and the one-cycle previous "DFIN". Thus obtained first correction factor "K1" is multiplied with the one-cycle previous "DFIN" to renew the value of "DFIN" (i.e. DFIN=DFIN×K1), thereafter ending the processing of this routine.

Regarding the value of first correction factor "K1", the setting is carried out based on the following fact.

In general, the current supply time of electromagnetic spill valve 18 is increased in response to the increase of accelerator angle θA. Correspondingly, the pressure chamber 13 is subjected to the hydraulic pressure increasing and lasting a relatively long time, causing a large influence by the torque reaction force. At the transition from the engine speed sync control to the constant interval control of 100 Hz, there is the tendency that the fuel injection timing is retarded. Therefore, it is necessary to decrease the value of "DFIN". Hence, the first correction factor "K1" is smaller than "1" and decreases with increasing accelerator angle θA.

As described above, the torque reaction force causes the fuel injection timing to retard at the moment of transition from the engine speed sync control to the constant interval control of 100 Hz when the duty ratio is maintained at the same value. However, the fourth embodiment corrects the value of "DFIN" in accordance with the accelerator angle θA, i.e. using the first correction factor "K1" reflecting the magnitude of the torque reaction force, thereby preventing the injection timing from abruptly changing or suppressing any shock from generating.

Meanwhile, when the value of flag "F" is not "1" in step 709, the flow proceeds to step 713 to further make a judgement as to whether the engine speed "N" is smaller than 3000 rpm. When the engine speed "N" is equal to or larger than 3000 rpm, the processing of this routine is ended. On the other hand, when the engine speed "N" is smaller than 3000 rpm, the flow proceeds to step 714 to renew the value of flag "F" to "1", thereafter proceeding step 715.

In step 715, a second correction factor "K2" is obtained using a data map expressing the value of second correction factor "K2" in relation to the accelerator angle θA and the one-cycle previous "DFIN". Thus obtained second correction factor "K2" is multiplied with the one-cycle previous "DFIN" to renew the value of "DFIN" (i.e. DFIN=DFIN× K2), thereafter ending the processing of this routine.

Regarding the value of second correction factor "K2", the setting is carried out based on the following fact.

In general, the current supply time of electromagnetic spill valve 18 is increased in response to the increase of accelerator angle θA. Correspondingly, the pressure chamber 13 is subjected to the hydraulic pressure increasing and lasting a relatively long time, causing a large influence by the torque reaction force. At the transition from the constant interval control of 100 Hz to the engine speed sync control, there is the tendency that the fuel injection timing is advanced. Therefore, it is necessary to increase the value of "DFIN". Hence, the second correction factor "K2" is larger than "1" and increases with increasing accelerator angle θA.

As described above, the torque reaction force causes the fuel injection timing t0 advance at the moment of transition from the constant interval control of 100 Hz to the engine speed sync control when the duty ratio is maintained at the same value. However, the fourth embodiment corrects the value of "DFIN" in accordance with the accelerator angle θA, i.e. using the second correction factor "K2" reflecting the magnitude of the torque reaction force, thereby preventing the injection timing from abruptly changing or suppressing any shock from generating.

When the step 702 does not detect reference signal "A" (i.e. "NO" in the Step 702), the flow proceeds to step 703 to increment the NE pulse number "C" by 1; i.e. C=C+1.

Then, a judgement is made in the next step 704 to check whether the flag "F" is equal to "1", i.e. to judge whether the engine speed sync control for hydraulic pressure control valve 27 should be performed. When the flag "F" is not "1", the processing of this routine is ended. When the flag "F" is equal to "1", the flow proceeds to step 705.

In step 705, another judgement is further made to check the present NE pulse number "C" is equal to "11". The purpose of providing this step 705 is to detect the arrival of the signal output timing for sending out the pulse actuating signal to hydraulic pressure control valve 27. If "C" is not equal to "11" in step 705, the processing of this interrupt routine is ended.

Figure 23:
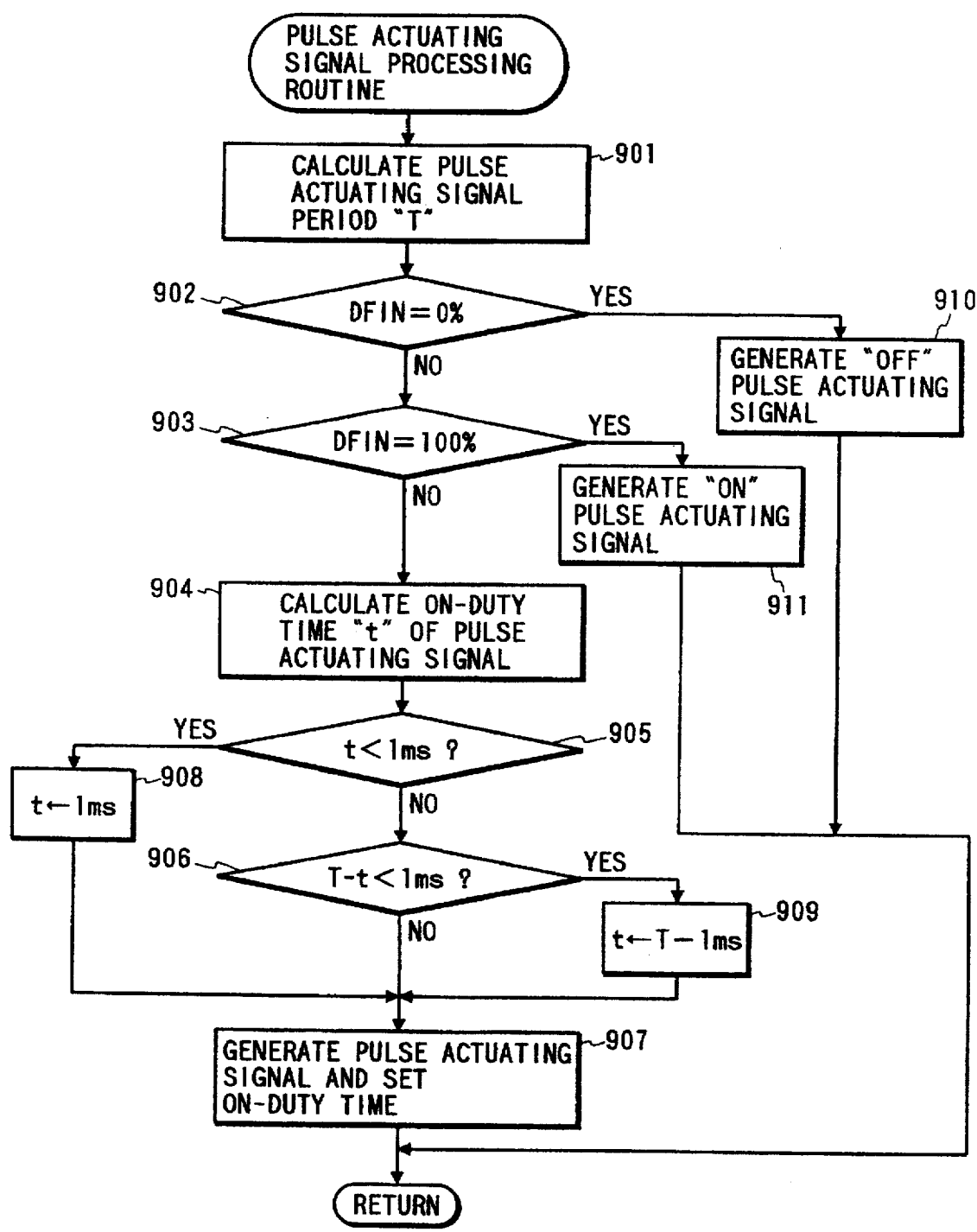
FIG. 23 is a flow chart showing details of the pulse actuating signal processing routine in accordance with the fourth embodiment of the present invention.

On the other hand, when "C" is equal to "11" in step 705, it indicates the arrival of the signal output timing for sending out the pulse actuating signal to hydraulic pressure control valve 27. Thus, the flow proceeds to step 706 wherein a predetermined pulse actuating signal processing routine shown in FIG. 23 is performed, thereafter ending the processing of this routine.

What is meant by the value of flag "F" is as follows.

When "F" is "1", the hydraulic pressure control valve 27 is controlled in synchronism with the engine speed "N" by checking the arrival of fuel injection timing using the NE pulse number "C" as explained in the steps 704 through 706. According to this fourth embodiment, the flag "F" is set to "1" when the engine speed is less than 3000 rpm. In other words, the fourth embodiment of the present invention controls the hydraulic pressure control valve 27 in synchronism with the engine speed when the engine speed is in the predetermined low speed region.

Figure 22:
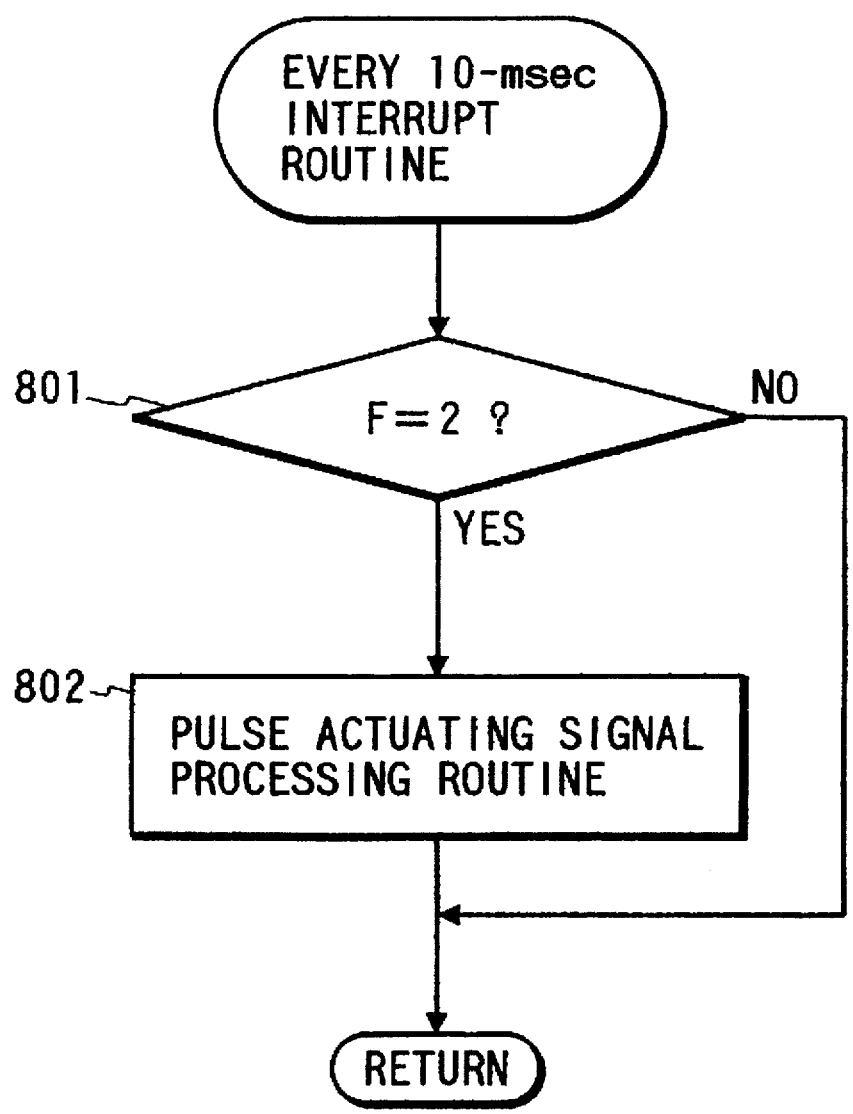
FIG. 22 is a flow chart showing a constant-interval interrupt routine for generating a pulse actuating signal performed irrespective of engine speed in accordance with the fourth embodiment of the present invention.

On the contrary, when "F" is "2", the hydraulic pressure control valve 27 is controlled at constant intervals of, for example, 100 Hz. FIG. 22 is a flow chart showing such a constant-interval interrupt routine performed irrespective of engine speed "N". This routine is started every 10 msec. In step 801, a judgement is made to check whether the value of flag "F" is equal to "2". When the value of flag "F" is not equal to "2", the processing of this routine is ended. On the other hand, when the value of flag "F" is equal to "2", the flow proceeds to step 802 to perform the pulse actuating signal processing routine shown in FIG. 23. Then, the processing of this routine is ended.

As explained above, the fourth embodiment of the present invention controls the hydraulic pressure control valve 27 at constant intervals irrespective of the engine speed when "F" is "2"; as explained in the steps 801 and 802 of FIG. 22.

FIG. 23 is a flow chart showing the details of the pulse actuating signal processing routine performed in step 706 of FIG. 21 and step 802 of FIG. 22 in accordance with the fourth embodiment.

In step 901, a period "T" of the pulse actuating signal is obtained based on engine speed "N" and the value of flag "F" determined in the routine shown in FIG. 21.

Then, a judgement is made in the next step 902 to check whether the value of "DFIN" is 0%. When "DFIN" is equal to 0%, the flow proceeds to step 910 to generate an "OFF" pulse actuating signal from actuating circuit 42, thereafter ending the processing of this routine. Namely, the hydraulic pressure control valve 27 is continuously supplied with a 100% OFF actuating signal, so that the hydraulic pressure control valve 27 completely closes relief passage 51.

On the other hand, if the value of "DFIN" is not 0% in step 902, another judgement is made in the next step 903 to check whether "DFIN" is 100%. When "DFIN" is equal to 100%, the flow proceeds to step 911 to generate an "ON" pulse actuating signal from actuating circuit 42, thereafter ending the processing of this routine. Namely, the hydraulic pressure control valve 27 is continuously supplied with a 100% ON actuating signal, so that the hydraulic pressure control valve 27 completely opens relief passage 51.

On the other hand, if the value of "DFIN" is not 100% in step 903, the flow proceeds to step 904 to calculate an ON-duty time "t" of the pulse actuating signal based on the pulse actuating signal period "T" obtained in step 901, engine speed "N" or the value of flag "F".

Then, a judgement is made in the next step 905 to check whether the ON-duty time "t" is smaller than 1 ms. In this case, "1 ms" is a minimum valve-open time determined in view of the performance of hydraulic pressure control valve 27. When "t" is smaller than 1 ms, the flow proceeds to step 908 wherein the value of "t" is equalized to 1 ms, thereafter proceeding to step 907. If the ON-duty time "t" is equal to or larger than 1 ms, in step 905, the flow proceeds to step 906 to further make another judgement to check whether the value of "T–t" is smaller than 1 ms.

When "T–t" is smaller than 1 ms in step 906, the flow proceeds to step 903 wherein the value of "t" is set to "T–1 ms", thereafter proceeding to step 907. Meanwhile, when "T–t" is equal to or larger than 1 ms in step 906, the flow proceeds to step 907.

In step 907, actuating circuit 42 turns the actuating signal into "ON" condition and sets the ON-duty time "t" obtained in step 904, thereby turning the actuating signal into "OFF" condition after the passage of ON-duty time "t". Then, the processing of this routine is ended.

As this invention may be embodied in several forms without departing from the spirit of essential characteristics thereof, the present embodiments described are therefore intended to be only illustrative and not restrictive, since the scope of the invention is defined by the appended claims rather than by the description preceding them, and all changes that fall within metes and bounds of the claims, or equivalents of such metes and bounds, are therefore intended to be embraced by the claims.

What is claimed is:

1. A fuel injection timing control apparatus for a fuel injection pump, comprising:

fuel injection timing adjusting means for adjusting a fuel injection timing of the fuel injection pump by controlling a rotational position of a roller ring or an equivalent member of said fuel injection pump through a timer piston slidable and housed in a timer device, said timer piston being positioned in equilibrium with hydraulic pressure of fuel supplied in a pressure chamber of said timer device;

a hydraulic pressure control valve opened and closed in response to a pulse actuating signal having a duty ratio controllable, for controlling the hydraulic pressure of said fuel supplied in said pressure chamber of said timer device;

operating condition detecting means for detecting operating conditions of a diesel engine which is supplied with fuel from said fuel injection pump;

target fuel injection timing calculating means for calculating a target fuel injection timing of said fuel injection pump based on the operating conditions detected by said operating condition detecting means;

actuating signal control means for controlling the duty ratio of said pulse actuating signal fed to said hydraulic pressure control valve in such a manner that the fuel injection timing adjusted by said fuel injection timing adjusting means is equalized with said target fuel injection timing calculated by said target fuel injection timing calculating means;

rotational angle detecting means for detecting a predetermined rotational angle prior to a fuel injection by said fuel injection pump; and actuating signal generating means for generating said pulse actuating signal having the duty ratio controlled by said actuating signal control means at a predetermined pulse output timing, said pulse output timing being determined based on the rotational angle detected by said rotational angle detecting means and a rotational speed of said diesel engine so that the fuel injection caused by a force feeding stroke of said fuel injection pump is not overlapped with an actual valve-open duration of said hydraulic pressure control valve varying depending on the rotational speed of said diesel engine, thereby completely locking said timer piston during said fuel injection.

2. The fuel injection timing control apparatus defined by claim 1, further comprising a check valve provided in a fluid passage connecting said pressure chamber of said timer device and a reduced-pressure chamber of said fuel injection pump.

3. The fuel injection timing control apparatus defined by claim 2, wherein said check valve is constituted by a ball closing said fluid passage by gravity.

4. The fuel injection timing control apparatus defined by claim 1, wherein said pulse output timing is determined taking account of a delay time of a valve member of said hydraulic control valve.

5. The fuel injection timing control apparatus defined by claim 1, wherein said pulse output timing is advanced in accordance with the rotational speed of said diesel engine.

6. The fuel injection timing control apparatus defined by claim 1, wherein said pulse output timing is synchronized with said rotational speed of said diesel engine in a limited engine operating region where said rotational speed of said diesel engine is lower than a predetermined engine speed.

7. The fuel injection timing control apparatus defined by claim 6, wherein said pulse output timing is set at constant intervals irrespective said rotational speed of said diesel engine when said rotational speed of said diesel engine is higher than said predetermined engine speed.

8. The fuel injection timing control apparatus defined by claim 7, wherein a ratio of ON-duty of said pulse actuating signal fed to said hydraulic pressure control valve is corrected by a correction factor reflecting an angle of an accelerator when the control of said pulse output timing is switched at said predetermined engine speed.

9. The fuel injection timing control apparatus defined by claim 8, wherein said correction factor is smaller than 1 and decreases with increasing angle of said accelerator at a moment the rotational speed of said diesel engine exceeds said predetermined engine speed.

10. The fuel injection timing control apparatus defined by claim 8, wherein said correction factor is larger than 1 and increases with increasing angle of said accelerator at a moment the rotational speed of said diesel engine falls below said predetermined engine speed.

11. The fuel injection timing control apparatus defined by claim 1, wherein, when an ON-duty time of said pulse actuating signal fed to said hydraulic pressure control valve is smaller than a predetermined minimum valve-open time, said ON-duty time is equalized to said minimum valve-open time.

12. A fuel injection timing control method for a fuel injection pump, comprising steps of:

detecting operating conditions of a diesel engine which is supplied with fuel from said fuel injection pump;

calculating a target fuel injection timing of said fuel injection pump based on the detected operating conditions of said diesel engine;

calculating an actual fuel injection timing of said fuel injection pump based on crank angle signals;

calculating a fuel injection timing error based on a difference between said target fuel injection timing and said actual fuel injection timing;

adjusting the actual fuel injection timing of the fuel injection pump by controlling a rotational position of a roller ring or an equivalent member of said fuel injection pump through a timer piston slidable and housed in a timer device, said timer piston being positioned in equilibrium with hydraulic pressure of fuel supplied in a pressure chamber of said timer device, said hydraulic pressure being varied by opening and closing a hydraulic pressure control valve in response to a pulse actuating signal having a duty ratio controllable in such a manner that said actual fuel injection timing is equalized with said target fuel injection timing;

detecting a predetermined rotational angle prior to a fuel injection by said fuel injection pump;

generating said pulse actuating signal having the controlled duty ratio at a predetermined pulse output timing, said output timing being determined based on the detected rotational angle and a rotational speed of said diesel engine so that the fuel injection caused by a force feeding stroke of said fuel injection pump is not overlapped with an actual valve-open duration of said hydraulic pressure control valve varying depending on the rotational speed of said diesel engine, thereby completely locking said timer piston during said fuel injection.

13. The fuel injection timing control method defined by claim 12, wherein said pulse output timing is determined taking account of a delay time of a valve member of said hydraulic control valve.

14. The fuel injection timing control method defined by claim 12, wherein said pulse output timing is advanced in accordance with the rotational speed of said diesel engine.

15. The fuel injection timing control method defined by claim 12, wherein said pulse output timing for generating said pulse actuating signal is determined so as to open said hydraulic pressure control valve in synchronism with a termination of said force feeding stroke of said fuel injection pump.

16. The fuel injection timing control method defined by claim 12, wherein a ratio of ON-duty of said pulse actuating signal fed to said hydraulic pressure control valve is restricted within a predetermined range.

17. The fuel injection timing control method defined by claim 12, wherein said pulse output timing is synchronized with said rotational speed of said diesel engine in a limited engine operating region where said rotational speed of said diesel engine is lower than a predetermined engine speed.

18. The fuel injection timing control method defined by claim 17, wherein said pulse output timing is set at constant intervals irrespective said rotational speed of said diesel engine when said rotational speed of said diesel engine is higher than said predetermined engine speed.

19. The fuel injection timing control method defined by claim 18, wherein a ratio of ON-duty of said pulse actuating signal fed to said hydraulic pressure control valve is corrected by a correction factor reflecting an angle of an accelerator when the control of said pulse output timing is switched at said predetermined engine speed.

20. The fuel injection timing control method defined by claim 19, wherein said correction factor is smaller than 1 and decreases with increasing angle of said accelerator at a moment the rotational speed of said diesel engine exceeds said predetermined engine speed.

21. The fuel injection timing control method defined by claim 19, wherein said correction factor is larger than 1 and increases with increasing angle of said accelerator at a moment the rotational speed of said diesel engine falls below said predetermined engine speed.

22. The fuel injection timing control method defined by claim 12, wherein, when an ON-duty time of said pulse actuating signal fed to said hydraulic pressure control valve is smaller than a predetermined minimum valve-open time, said ON-duty time is equalized to said minimum valve-open time.

23. A fuel injection timing control apparatus for a fuel injection pump, comprising:

fuel injection timing adjusting means for adjusting a fuel injection timing of the fuel injection pump by controlling a rotational position of a roller ring or an equivalent member of said fuel injection pump through a timer piston slidable and housed in a timer device, said timer piston being positioned in equilibrium with hydraulic pressure of fuel supplied in a pressure chamber of said timer device;

a hydraulic pressure control valve opened and closed in response to a pulse actuating signal having a duty ratio controllable, for controlling the hydraulic pressure of said fuel supplied in said pressure chamber of said timer device;

operating condition detecting means for detecting operating conditions of a diesel engine which is supplied with fuel from said fuel injection pump;

target fuel injection timing calculating means for calculating a target fuel injection timing of said fuel injection pump based on the operating conditions detected by said operating condition detecting means;

actuating signal control means for controlling the duty ratio of said pulse actuating signal fed to said hydraulic pressure control valve in such a manner that the fuel injection timing adjusted by said fuel injection timing adjusting means is equalized with said target fuel injection timing calculated by said target fuel injection timing calculating means;

rotational angle detecting means for detecting a predetermined rotational angle; and actuating signal generating means for generating said pulse actuating signal having the duty ratio controlled by said actuating signal control means at a predetermined pulse output timing, said pulse output timing being determined based on the rotational angle detected by said rotational angle detecting means and a rotational speed of said diesel engine so that the fuel injection caused by a force feeding stroke of said fuel injection pump is not overlapped with an actual valve-open duration of said hydraulic pressure control valve varying depending on the rotational speed of said diesel engine.

24. The fuel injection timing control apparatus defined by claim 23, further comprising a check valve provided in a fluid passage connecting said pressure chamber of said timer device and a low-pressure chamber of said fuel injection pump.

25. The fuel injection timing control apparatus defined by claims 24, wherein said check valve is constituted by a ball closing said fluid passage by gravity.

26. The fuel injection timing control apparatus defined by claim 23, wherein said pulse output timing is determined taking account of a delay time of a valve member of said hydraulic control valve.

27. The fuel injection timing control apparatus defined by claim 23, wherein said pulse output timing is advanced in accordance with the rotational speed of said diesel engine.

28. The fuel injection timing control apparatus defined by claim 23, wherein said pulse output timing is synchronized with said rotational speed of said diesel engine in a limited engine operating region where said rotational speed of said diesel engine is lower than a predetermined engine speed.

29. The fuel injection timing control apparatus defined by claim 28, wherein said pulse output timing is set at constant intervals irrespective of said rotational speed of said diesel engine when said rotational speed of said diesel engine is higher than said predetermined engine speed.

30. The fuel injection timing control apparatus defined by claim 29, wherein a ration of ON-duty of said pulse actuating signal fed to said hydraulic pressure control valve is corrected by a correction factor, reflecting an angle of an accelerator when the control of said pulse output timing is switched at said predetermined engine speed.

31. The fuel injection timing control apparatus defined by claim 30, wherein said correction factor is smaller than 1 and decreases with increasing angle of said accelerator at a moment the rotational speed of said diesel engine exceeds said predetermined engine speed.

32. The fuel injection timing control apparatus defined by claim 30, wherein said correction factor is larger than 1 and increases with increasing angle of said accelerator at a moment the rotational speed of said diesel engine falls below said predetermined engine speed.

33. The fuel injection timing control apparatus defined by claim 23, wherein, when an ON-duty time of said pulse actuating signal fed to said hydraulic pressure control valve is smaller than a predetermined minimum valve-open time, said ON-duty time is equalized to said minimum valve-open time.

34. A fuel injection timing control method for a fuel injection pump, comprising steps of:

detecting operating conditions of a diesel engine which is supplied with fuel from said fuel injection pump;

calculating a target fuel injection timing of said fuel injection pump based on the detected operating conditions of said diesel engine;

calculating an actual fuel injection timing of said fuel injection pump based on crank angle signals;

calculating a fuel injection timing error based on a difference between said target fuel injection timing and said actual fuel injection timing;

adjusting the actual fuel injection timing of the fuel injection pump by controlling a rotational position of a roller ring or an equivalent member of said fuel injection pump through a timer piston slidable and housed in a timer device, said timer piston being positioned in equilibrium with hydraulic pressure of fuel supplied in a pressure chamber of said timer device, said hydraulic pressure being varied by opening and closing a hydraulic pressure control valve in response to a pulse actuating signal having a duty ratio controllable in such a manner that said actual fuel injection timing is equalized with said target fuel injection timing;

detecting a predetermined rotational angle;

generating said pulse actuating signal having the controlled duty ratio at a predetermined pulse output timing, said output timing being determined based on the detected rotational angle and a rotational speed of said diesel engine so that the fuel injection caused by a force feeding stroke of said fuel injection pump is not overlapped with an actual valve-open duration of said hydraulic pressure control valve varying depending on the rotational speed of said diesel engine.

35. The fuel injection timing control method defined by claim 34, wherein said pulse output timing is determined taking account of a delay time of a valve member of said hydraulic control valve.

36. The fuel injection timing control method defined by claim 34, wherein said pulse output timing is advanced in accordance with the rotational speed of said diesel engine.

37. The fuel injection timing control method defined by claim 34, wherein said pulse output timing for generating said pulse actuating signal is determined so as to open said hydraulic pressure control valve in synchronism with a termination of said force feeding stroke of said fuel injection pump.

38. The fuel injection timing control method defined by claim 34, wherein a ration of ON-duty of said pulse actuating signal fed to said hydraulic pressure control valve is restricted with a predetermined range.

39. The fuel injection timing control method defined by claim 34, wherein said pulse output timing is synchronized with said rotational speed of said diesel engine in a limited engine operating region where said rotational speed of said diesel engine is lower than a predetermined engine speed.

40. The fuel injection timing control method defined by claim 39, wherein said pulse output timing is set at constant intervals irrespective of said rotational speed of said diesel engine when said rotational speed of said diesel engine is higher than said predetermined engine speed.

41. The fuel injection timing control method defined by claim 40, wherein a ratio of ON-duty of said pulse actuating signal fed to said hydraulic pressure control valve is corrected by a correction factor reflecting an angle of an accelerator when the control of said pulse output timing is switched at said predetermined engine speed.

42. The fuel injection timing control method defined by claim 41, wherein said correction factor is smaller than 1 and decreases with increasing angle of aid accelerator at a moment the rotational speed of said diesel engine exceeds said predetermined engine speed.

43. The fuel injection timing control method defined by claim 41, wherein said correction factor is larger than 1 and increases with increasing angle of said accelerator at a moment the rotational speed of said diesel engine falls below said predetermined engine speed.

44. The fuel injection timing control method defined by claim 34, wherein, when an ON-duty time of said pulse actuating signal fed to said hydraulic pressure control valve is smaller than a predetermined minimum, valve-open time, said ON-duty time is equalized to said minimum valve-open time.

45. A fuel injection timing control apparatus for a fuel injection pump, comprising:

fuel injection timing adjusting means for adjusting a fuel injection timing of the fuel injection pump by controlling a rotational position of a roller ring or an equivalent member of said fuel injection pump through a timer piston slidable in a timer device, said timer piston being positioned in equilibrium with hydraulic pressure of fuel supplied in a pressure chamber of said timer device;

a hydraulic pressure control valve opened and closed in response to a pulse actuating signal for controlling the hydraulic pressure of said fuel supplied in said pressure chamber of said timer device;

target fuel injection timing calculating means for calculating a target fuel injection timing of said fuel injection pump based on the operating conditions of an engine which is supplied with fuel from said fuel injection pump;

actuating signal control means for controlling said pulse actuating signal fed to said hydraulic pressure control valve in such a manner that the difference between the fuel injection timing adjusted by said fuel injection timing adjusting means and said target fuel injection timing calculated by said target fuel injection timing calculating means is smaller than a predetermined value;

rotational angle detecting means for detecting a predetermined rotational angle by said fuel injection pump; and actuating signal generating means for generating said pulse actuating signal controlled by said actuating signal control means at a predetermined pulse output timing, said pulse output timing being determined based on the rotational angle detected by said rotational angle detecting means and a rotational speed of said engine so that the fuel injection caused by a force feeding stroke of said fuel injection pump is not overlapped with an actual valve-open duration of said hydraulic pressure control valve varying depending on the rotational speed of said engine.

46. The fuel injection timing control apparatus defined by claim 45, further comprising a check valve provided in a fluid passage connecting said pressure chamber of said timer device and a low-pressure chamber of said fuel injection pump.

* * * * *